United States Patent
Norimatsu

(10) Patent No.: US 8,678,661 B2
(45) Date of Patent: Mar. 25, 2014

(54) WHEEL BEARING APPARATUS FOR A VEHICLE

(75) Inventor: Takayuki Norimatsu, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/155,501

(22) Filed: Jun. 8, 2011

(65) Prior Publication Data

US 2011/0235958 A1 Sep. 29, 2011

Related U.S. Application Data

(63) Continuation of application No. PCT/JP2009/006700, filed on Dec. 8, 2009.

(30) Foreign Application Priority Data

Dec. 9, 2008 (JP) .................................. 2008-313438
Dec. 9, 2008 (JP) .................................. 2008-313439

(51) Int. Cl.
*F16C 33/58* (2006.01)
*F16C 13/00* (2006.01)

(52) U.S. Cl.
USPC .......................................... 384/516; 384/544

(58) Field of Classification Search
USPC ........................... 384/491, 492, 513, 516, 544
See application file for complete search history.

(56) References Cited

U.S. PATENT DOCUMENTS

| 3,370,899 A | * | 2/1968 | Eklund | 384/516 |
| 2004/0076355 A1 | * | 4/2004 | Ishiguro et al. | 384/516 |
| 2005/0111771 A1 | * | 5/2005 | Shevket | 384/544 |

FOREIGN PATENT DOCUMENTS

| CN | 101583804 | 11/2009 |
| EP | 2 123 924 | 11/2009 |
| JP | 3321228 | 9/2002 |
| JP | 2002-349576 | 12/2002 |
| JP | 2004-108449 | 4/2004 |
| JP | 2006-009895 | 1/2006 |
| JP | 2007-032830 | 2/2007 |
| JP | 2008-008436 | 1/2008 |
| JP | 2008-180364 | 8/2008 |
| WO | WO 2008/075535 | 6/2008 |

* cited by examiner

*Primary Examiner* — Alan B Waits
(74) *Attorney, Agent, or Firm* — Harness, Dickey & Pierce, P.L.C.

(57) ABSTRACT

A vehicle wheel bearing apparatus has an outer member, an inner member, and double row balls contained between the outer and inner raceway surfaces and adapted to be applied a predetermined contact angle. Each inner raceway surface is formed by a first circular arc section, with a first radius of curvature (r), that extends from a position near a contact point contacting the ball at an initial contact angle ($\alpha$) to the raceway bottom. The second circular arc section, with a second radius of curvature (r1) smaller than the radius of curvature r, extends from an inflection point that the ball contacts at a contact angle ($\alpha$1) to the radially outer side. The (r) and (r1) are set as 1.05 d<2 r≤1.10 d and 1.01 d<2 r1≤1.05 d ("d" is a diameter of the ball). $\Delta\alpha$ is in a range of 2° to 8° when the inflection point of the radii of curvatures r, r1 is positioned at $\alpha 1 = \alpha + \Delta\alpha$ ($\alpha = 30\text{-}45°$).

18 Claims, 12 Drawing Sheets

(a)

(b)

d1>d2
Regularity: large-small-large-small ...

d1>d2
Regularity: large-small-small-large-small-small ...

d1>d2
Regularity: large-large-small-large-large-small ...

0.2mm

1) 高緻密層 : High dense layer
2) 緻密層　 : Dense layer
3) 内部　　 : Inside portion (a)

(b)

WHEEL BEARING APPARATUS FOR A VEHICLE

CROSS-REFERENCE TO RELATED APPLICATIONS

This application is a continuation of International Application No. PCT/JP2009/006700, filed Dec. 8, 2009, which claims priority to Japanese Application Nos. 2008-313438, filed Dec. 9, 2008 and 2008-313439, filed Dec. 9, 2008. The disclosures of the above applications are incorporated herein by reference.

FIELD

The present disclosure relates to a wheel bearing apparatus that freely rotationally supports a wheel of a vehicle, such as an automobile, relative to a suspension apparatus and, more particularly, to a vehicle wheel bearing apparatus intended to have an improved durability while assuring proper bearing pre-load and bearing rigidity in accordance with traveling conditions of the vehicle.

BACKGROUND

Wheel bearing apparatus has been improved in order to reduce its size and weight to improve fuel consumption of the vehicle while reducing its manufacturing cost. The wheel bearing apparatus has a unit structure including a wheel hub and a rolling bearing. A wheel bearing apparatus of a so-called third generation type integrally comprises an inner member and an outer member along with a flange. The inner member comprises a wheel hub and an inner ring press-fit onto the wheel hub. One of the double row inner raceway surfaces is directly formed on the wheel hub and the other of the double row inner raceway surfaces is formed on the inner ring.

FIG. 14 illustrates a known wheel bearing apparatus of the third generation type for a driving wheel intended to have improved durability while assuring proper bearing pre-load during straight-advancing travel of the vehicle as well as bearing rigidity during curving or turning travel. The wheel bearing apparatus comprises an inner member 51, an outer member 60 and double row balls 56, 56 rollably contained between the inner and outer members 51, 60. The inner member 51 includes the wheel hub 52 and a separate inner ring 53 press-fit onto the wheel hub 52. The wheel hub 52 is integrally formed on its outer side end with a wheel mounting flange 54. Hub bolts 55, for securing a wheel, are mounted on the wheel mounting flange 54 equidistantly along its periphery.

The wheel hub 52 is formed with an inner raceway surface 52a on its outer circumference. A cylindrical portion 52b axially extends from the inner raceway surface 52a. The inner ring is formed with an inner raceway surface 53a on its outer circumference. The inner ring is press-fit onto the cylindrical portion 52b and axially secured thereon by a caulked portion 52c. The caulked portion 52c is formed by plastically deforming the end of the cylindrical portion 52b radially outward.

The outer member 60 is integrally formed with a body mounting flange 60b on its outer circumference. The outer member 60 is also formed with double row outer raceway surface 60a, 60a on its inner circumference. Double row balls 56, 56 are rollably contained, via cages 57, 57, between the inner and outer raceway surfaces 52a, 53a and 60a, 60a under an applied predetermined contact angle α (FIG. 15). Seals 58, 59 are arranged on both ends of the outer member 60 to prevent leakage of lubricating grease sealed within the bearing. The seals 58, 59 also prevent the entry of rain water or dust from the outside into the bearing.

A constant velocity universal joint 61 has an outer joint member 65 integrally formed with a cup shaped mouth portion 62, a shoulder portion 63, and a shaft portion 64. The shoulder portion 63 forms the bottom of the mouth portion 62. The shaft portion 64 axially extends from the shoulder portion 63. The shaft portion 64 of the outer joint member 65 is inserted into the inner member 51 via a torque transmittable mechanism. The outer joint member 65 is separably secured to the wheel hub 52 by a securing nut 67 fastened onto a male thread 66 formed on the shaft portion 64 after the shaft portion 64 is inserted into the wheel hub 52 until the shoulder portion 63 abuts against the caulked portion 52c of the wheel hub 52.

As shown in FIG. 15(a) the cross-section of the inner raceway surface 53a of the inner ring 53 is formed by two circular arcs of different radii of curvatures. That is, the inner raceway surface 53a of the inner ring 53 is formed by a circular arc with a radius of curvature "r", and a circular arc with a radius of curvature "r1". The radius of curvature "r" extends from a position near a contact point P that contacts the ball 56 at an initial contact angle α to a raceway bottom. The circular arc with a radius of curvature "r1" extends from a position near the contact point P to an outer circumference of a larger diameter of the inner ring 53.

As shown in FIG. 15(a) by cross-hatchings, the radius of curvature r is set larger than r1 and has a range 1.05 d<2 r≤1.10 d (wherein "d" is a diameter of the ball 56). The radius of curvature r1 is set within a range of 1.01 d≤2 r1≤1.05 d. Accordingly, as shown in FIG. 15 (b), the inner raceway surface 53a contacts with the ball 56 at the contact point P via the initial contact angle α and a predetermined pre-loading level during steady travel (straight advancing travel) of the vehicle. Also, the inner raceway surface 53a contacts with the ball 56 at the contact point P1 via the contact angle α1 and a predetermined pre-load level during curving travel of the vehicle where a moment load is applied to the wheel bearing apparatus.

As shown in FIG. 15(a), the outer raceway surface 60a of the outer member 60 is also formed by two circular arcs with different radii of curvature r2, r3. The circular arc with the radius of curvature r2 extends from a position near a contact point Q contacting the ball 56 at an initial contact angle α to a raceway bottom. The circular arc with the radius of curvature r3 extends from a position near the contact point Q to an inner circumference 60c of the outer member 60.

As shown in FIG. 15 (a) by cross-hatchings, the radius of curvature r2 is set larger than r3 and has a range 1.07 d<2 r2≤1.12 d (wherein "d" is a diameter of the ball 56). The radius of curvature r3 is set within a range 1.03 d≤2 r3≤1.07 d (wherein "d" is a diameter of the ball 56). Accordingly, as shown in FIG. 15 (b), the outer raceway surface 60a contacts with the ball 56 at the contact point Q at the initial contact angle α and with a predetermined pre-loading level during steady travel (straight advancing travel) of the vehicle. Also, the outer raceway surface 60a contacts the ball 56 at the contact point Q1 at the contact angle α1 and with a predetermined pre-loading level during curving travel of the vehicle where a moment load is applied to the wheel bearing apparatus.

Accordingly, it is possible to assure the initially applied pre-load and thus prevent an increase of the rolling resistance while suppressing an excessive pre-load during steady travel as well as to increase the pre-load level in accordance with the increase of moment load and thus improve the durability of the bearing rigidity without adding any part during curving travel of the vehicle. See, Japanese Laid-open Patent Publication No. 009895/2006.

Although the prior art wheel bearing apparatus is structured so that the inner and outer raceway surfaces are contacted by the ball, at a predetermined pre-load level in accordance with the contact angle varying according to the travelling conditions of the vehicle, generally a moment load is applied to the bearing and the initial contact angle α gradually increases and shifts to α1 during curving travel of the vehicle. However, for example, in the inner raceway surface 53a of the inner ring 53 formed by the two radii of curvature r, r1, since an inflection point (transition) of the two different radii of curvature r, r1 is not clearly set, it is believed that an excessive pre-load will be caused during steady travel of the vehicle or the pre-load would be insufficient during curving travel of the vehicle. Thus, it is required to set a proper inflection point.

In addition, in such a wheel bearing apparatus, since the inner raceway surface 53a is formed by two circular arc sections of two different radii of curvatures r, r1, a grinding work must be carried out by using a formed grinding wheel having a configuration of the inner raceway surface 53a. Accordingly, several kinds of formed grinding wheels are required to manufacture corresponding wheel bearings of different size specifications. Thus, the manufacturing cost, including an administrative expense of the wheel bearing, would be increased.

It is, therefore, an object of the present disclosure to provide a wheel bearing apparatus for a vehicle that can improve its durability by assuring a proper pre-load during straight advancing travel of the vehicle and also by assuring a proper bearing rigidity during curving travel of the vehicle as well as reduce the manufacturing cost by flexibly corresponding to the bearing specifications.

SUMMARY

In order to achieve the object of the present disclosure, a vehicle wheel bearing apparatus is provided that comprises an outer member formed with double row outer raceway surfaces on its inner circumference. An inner member is formed with double row inner raceway surfaces on its outer circumference. The inner raceway surfaces oppose the double row outer raceway surfaces of the outer member. Double row balls are freely rollably contained between the outer and inner raceway surfaces and adapted to be applied a predetermined contact angle. At least the inner raceway surfaces of the outer and inner raceway surfaces are formed with circular arc sections each having two radii of curvature. Each inner raceway surface is formed by one circular arc section with a radius of curvature r. The circular arc cross section with the radius of curvature r extends from a position near a contact point contacting with the ball at an initial contact angle "α" to the raceway bottom. The other circular arc section with a radius of curvature "r1" is smaller than the radius of curvature "r". The circular arc section with the radius of curvature r1 extends from an inflection point where the ball contacts at a contact angle "α1" to the radially outer side. The radii of curvature r, r1 are set, respectively, as $1.05\,d < 2\,r \leq 1.10\,d$ and $1.01\,d < 2\,r1 \leq 1.05\,d$ (wherein "d" is a diameter of the ball) and $\Delta\alpha$ is set as a range of 2 to 8° when the inflection point of the radii of curvature r, r1 is positioned at $\alpha1 = \alpha + \Delta\alpha$ ($\alpha = 30\text{-}45°$).

The vehicle wheel bearing apparatus with the contact ball bearing includes an outer member formed with double row outer raceway surfaces on its inner circumference. An inner member is formed with double row inner raceway surfaces on its outer circumference. The inner raceway surfaces oppose the double row outer raceway surfaces of the outer member. Double row balls are freely rollably contained between the outer and inner raceway surfaces and adapted to be applied a predetermined contact angle. At least the inner raceway surfaces of the outer and inner raceway surfaces are formed with circular arc sections each having two radii of curvatures. Each inner raceway surface is formed by circular arc sections with a radius of curvature r and r1. The circular arc section with the radius or curvature r extends from a position near a contact point contacting with the ball at an initial contact angle α to the raceway bottom. The other circular arc section with a radius of curvature r1, smaller than the radius of curvature r, extends from an inflection point where the ball contacts at a contact angle α1 to the radially outer side. The radii of curvature r, r1 are set, respectively, as $1.05\,d < 2\,r \leq 1.10\,d$ and $1.01\,d < 2\,r1 \leq 1.05\,d$ (wherein "d" is a diameter of the ball) and $\Delta\alpha$ is set as a range of 2 to 8° when the inflection point of the radii of curvature r, r1 is positioned at $\alpha1 = \alpha + \Delta\alpha$ ($\alpha = 30\text{-}45°$). Thus, it is possible to assure the initially applied pre-load and thus prevent an increase of rolling resistance while suppressing an excessive pre-load during steady travel as well as to increase the pre-load level in accordance with an increase of moment load. Thus, this improves the durability of the bearing rigidity without adding any part during the curving travel of the vehicle.

The pitch circle diameter of the outer side ball group of the double row ball groups is set larger than the pitch circle diameter of the inner side ball group. This makes it possible to increase the bearing rigidity of the outer side as compared with the inner side. Also, this reduces the size and weight of the bearing which effectively utilizes the bearing space and thus makes it possible to extend the life of the bearing.

The outer raceway surfaces of the outer and inner raceway surfaces are formed with circular arc sections, each having two radii of curvatures. Each outer raceway surface is formed with one circular arc section with a radius of curvature "r2". The radius of curvature r2 extends from a position near a contact point contacting with the ball at an initial contact angle "α" to the raceway bottom. The other circular arc section with a radius of curvature "r3", smaller than the radius of curvature r2, extends from an inflection point where the ball contacts at a contact angle "α1" to the radially inner side. The radii of curvatures r2, r3 are set, respectively, as $1.07\,d < 2\,r2 \leq 1.12\,d$ and $1.03\,d < 2\,r3 \leq 1.07\,d$ (wherein "d" is a diameter of the ball). This makes it possible to further improve the bearing rigidity and thus its durability.

The inner raceway surfaces and the outer raceway surfaces are finished to have predetermined finished configurations by the quenched steel cutting after a heat treatment. This makes it possible to reduce the manufacturing cost including an administrative expense of the wheel bearing.

The pre-load level is set as 0 to 10 μm on straight-advancing travel and as 10 to 50 μm on curving travel. This makes it possible to prevent an increase of rolling resistance while suppressing an excessive pre-load during steady travel as well as to apply a proper pre-load level during curving travel of the vehicle and thus obtain a desired bearing life.

The balls of the double row ball groups are formed of balls with larger diameter and smaller diameter that are alternately arranged in a regular fashion. This provides a wheel bearing apparatus that can reduce a rotational torque of the bearing during straight advancing travel of a vehicle without suffering from the influence of variation in machining and/or a gap within the bearing can improve the bearing life during curving travel of the vehicle.

The difference in diameter of the larger diameter ball and the smaller diameter ball is set within a range of 5 to 10 µm. This makes it possible to reduce the rotational torque of the bearing since the radial load can be supported only by the balls of larger diameter during straight advancing travel of the vehicle where the radial load is mainly applied to the bearing. Thus, the rolling resistance is reduced. During curving travel of the vehicle, all of the balls in one row are loaded with the axial load in addition to the radial load since the balls with a smaller diameter are also loaded together with the balls of a larger diameter due to elastic deformation of the balls of the larger diameter and the raceway surfaces contacting with the balls of larger diameter. Thus, substantially the same bearing life as that of bearings of the prior art can be obtained although the rotational torque and thus the rotational resistance of the bearing can be reduced a little.

The balls of the double row ball groups are formed from ceramic balls and steel balls. This makes it possible to reduce the rotational torque of the bearing and improve its life.

Only the balls of the ball group on which the large load is loaded, when the moment load is loaded on the vehicle during curving travel of the vehicle, are formed of ceramic balls. The other balls of the ball group are formed from steel balls. This makes it possible to reduce the rotational torque of the bearing and improve the bearing life without increasing the manufacturing cost.

The balls of the double row ball groups are formed from ceramic balls and steel balls that are alternately arranged in a regular fashion.

The balls of the double row ball groups are formed of balls with larger diameters and smaller diameters that are alternately arranged in a regular fashion. The balls with a larger diameter are formed as ceramic balls. This makes it possible to further reduce the rotational torque of the bearing and to improve the bearing life.

The ceramic balls are formed from a sintered body comprising β-sialon as a primary ingredient having a composition formula of $Si_6\text{-}zAlzOzN_8\text{-}z$ and satisfying $0.1 \leq z \leq 3.5$ and the remainder of impurities. This makes it possible to provide a wheel bearing apparatus that can reduce rolling resistance during straight advancing travel of the vehicle and improve the bearing life while increasing bearing rigidity when being loaded with a high load during curving travel of the vehicle. In addition, it is possible to constantly assure a sufficient durability by adopting sintered material for the manufacturing of the ceramic balls.

The ceramic balls are formed from a sintered body comprising β-sialon as a primary ingredient having a composition formula of $Si_6\text{-}zAlzOzN_8\text{-}z$ and satisfying $0.1 \leq z \leq 3.5$ and the remainder of sintering assistant and irreversible impurities. This makes it possible to provide a wheel bearing apparatus that can reduce rolling resistance during straight advancing travel of the vehicle and improve the bearing life while increasing bearing rigidity when being loaded with a high load during curving travel of the vehicle. In addition, it is possible to easily reduce the porosity of the sintered body. Thus, this assures a sufficient durability by adopting a sintered body for manufacturing of the ceramic balls.

The ratio of a mixture of the steel balls and the ceramic balls is set within a range of 3:7 to 7:3 including 1:1. This makes it possible to achieve both a reduction of manufacturing cost and an improvement of the rotational torque and rigidity of the bearing.

The surface of the ceramic balls is formed with a dense layer having higher denseness than that of the inside of the balls. This improves the rolling fatigue life of the ceramic balls.

The square ratio of a white region of a cross-section of the dense layer observed as white when observed by inclined beams of an optical microscope is set at 7% or less. This makes it possible to improve the denseness and rolling fatigue life.

The region including the surface of the dense layer is formed with a high dense layer having further higher denseness than that of the other region inside the dense layer. This further improves the rolling fatigue life.

The square ratio of a white region of a cross-section of the high dense layer observed as white when observed by inclined beams of an optical microscope is set 3.5% or less. This also enables further improvement of the rolling fatigue life.

The vehicle wheel bearing apparatus comprises an outer member formed with double row outer raceway surfaces on its inner circumference. An inner member is formed with double row inner raceway surfaces on its outer circumference. The inner raceway surfaces oppose the double row outer raceway surfaces of the outer member. Double row balls are freely rollably contained between the outer and inner raceway surfaces and are adapted to be applied a predetermined contact angle. At least the inner raceway surfaces of the outer and inner raceway surfaces are formed as circular arc sections, each having two radii of curvatures. Each inner raceway surface is formed by one circular arc section of a radius of curvature r. The circular arc section of the radius of curvature r extends from a position near a contact point contacting with the ball at an initial contact angle α to the raceway bottom. The other circular arc section with a radius of curvature r1, smaller than the radius of curvature r, extends from an inflection point where the ball contacts at a contact angle α1 to the radially outer side. The radii of curvature r, r1 are set, respectively, as $1.05\,d < 2\,r \leq 1.10\,d$ and $1.01\,d < 2\,r1 \leq 1.05\,d$ (wherein "d" is a diameter of the ball) and $\Delta\,\alpha$ is set as a range of 2 to 8° when the inflection point of the radii of curvatures r, r1 is positioned at $\alpha 1 = \alpha + \Delta\alpha$ ($\alpha = 30\text{-}45°$). Thus, it is possible to assure the initially applied pre-load. Thus, this prevents an increase of rolling resistance while suppressing an excessive pre-load during steady travel as well as increasing the pre-load level in accordance with an increase of moment load. Thus, this improves the durability of the bearing rigidity without adding any part during curving travel of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2(*b*) is an explanatory view of a contacting condition between an outer member and a ball of FIG. 1.

DETAILED DESCRIPTION

A preferable mode for carrying out the present disclosure is a bearing apparatus for a wheel of a vehicle including an outer member formed with a body mounting flange on its outer circumference. The body mounting flange is to be mounted on a body of a vehicle. The outer member inner circumference includes double row outer raceway surfaces. An inner member includes a wheel hub and an inner ring. The wheel hub is integrally formed on its one end with a wheel mounting flange. The wheel hub outer circumference includes one inner raceway surface that opposes one of the outer side outer raceway surface. A cylindrical portion axially extends from the inner raceway surface. The inner ring is press-fit onto the cylindrical portion of the wheel hub, via a predetermined interference. The inner ring outer circumference includes the inner side inner raceway surface that opposes the inner side outer raceway surface of the outer member. Double row balls are freely rollably contained between the outer and inner raceway surfaces and are applied predetermined contact angles. The inner ring is axially secured relative to the wheel hub by a caulked portion. The caulking portion is formed by plastically deforming the cylindrical portion radially outward. At least the inner raceway surfaces of the outer and inner raceway surfaces are formed with circular arc sections each having two radii of curvatures. Each inner raceway surface is formed by one circular arc section with a radius of curvature r. The circular arc section with the radius of curvature r extends from a position near a contact point contacting with the ball at an initial contact angle α to the raceway bottom. The other circular arc section with a radius of curvature r1, smaller than the radius of curvature r, extends from an inflection point where the ball contacts at a contact angle α1 to the radially outer side. The radii of curvature r, r1 are set, respectively, as 1.05 d<2 r≤1.10 d and 1.01 d<2 r1≤1.05 d (wherein "d" is a diameter of the ball) and Δ α is set as a range of 2 to 8° when the inflection point of the radii of curvature r, r1 is positioned at α1=α+Δα (at α=30-45°).

Preferable embodiments of the present disclosure will be hereinafter described with reference to the drawings.

Figure 1:
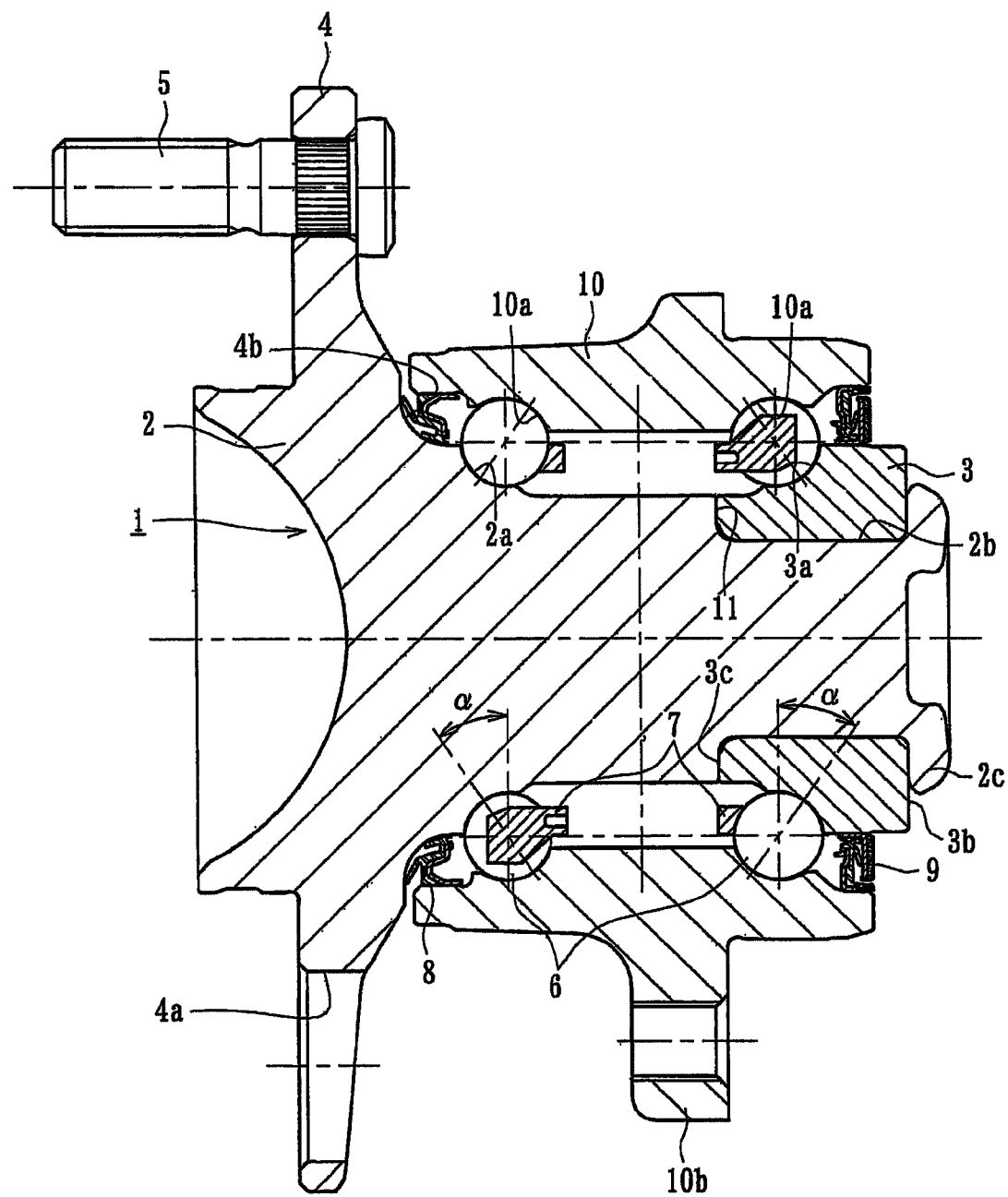
FIG. 1 is a longitudinal section view of a first embodiment of a vehicle wheel bearing apparatus.
Figure 2:
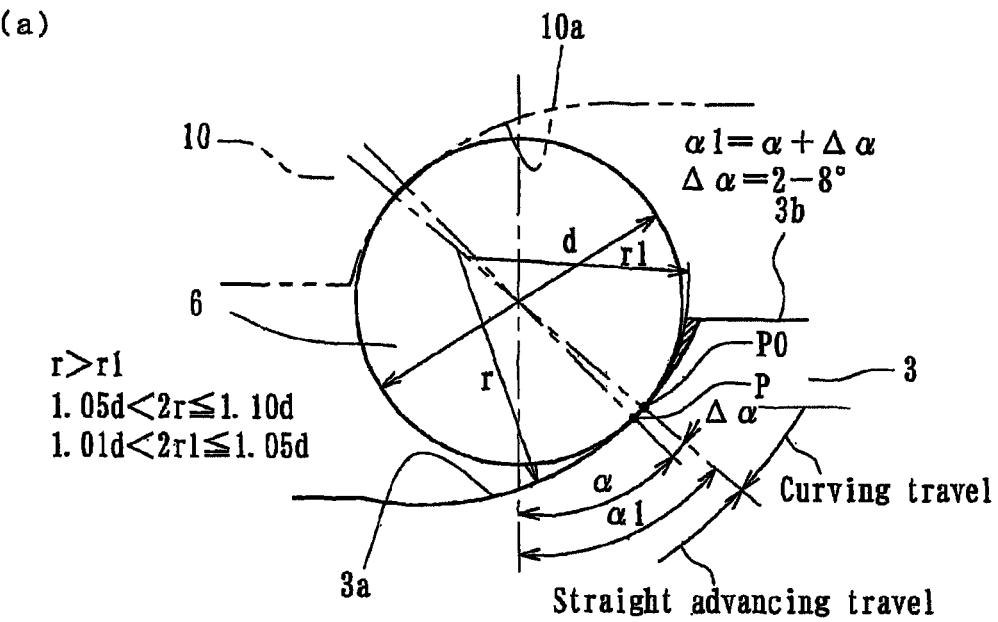
FIG. 2(*a*) is an explanatory view of a contacting condition between an inner ring and a ball of FIG. 1.
Figure 2:
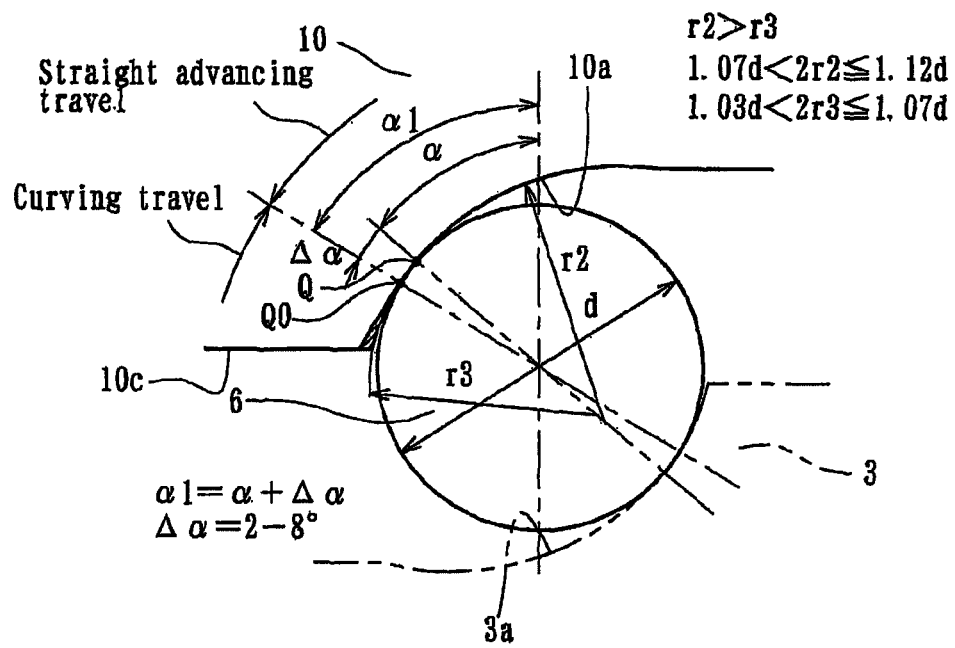

FIG. 1 is a longitudinal section view of a first embodiment of a vehicle wheel bearing apparatus. FIG. 2(a) is an explanatory view of a contacting condition between an inner ring and a ball of FIG. 1. FIG. 2(b) is an explanatory view of a contacting condition between an outer ring and a ball of FIG. 1. In the description below, the distal side of the wheel bearing apparatus, when it is mounted on a vehicle, is referred to as the "outer side" (a left side in FIG. 1). The proximal side of the wheel bearing apparatus is referred to as the "inner side" (a right side in FIG. 1).

The vehicle bearing apparatus of the present disclosure shown in FIG. 1 is a third generation type used for a driven wheel. It includes an inner member 1, an outer member 10, and double row balls 6, 6 rollably contained between the inner and outer members 1, 10. The inner member 1 includes a wheel hub 2 and an inner ring 3 press fit onto the wheel hub 2, via a predetermined interference.

The wheel hub 2 is integrally formed with a wheel mounting flange 4 at its outer-side end. Hub bolts 5 are equidistantly arranged along the periphery of the flange. Circular apertures 4a are formed between the hub bolts 5 on the wheel mounting flange 4. These circular apertures 4a not only contribute to the reduction of weight of the wheel hub 2 but also enable easy fastening of knuckle bolts (not shown). The fastening is accomplished using tools without being disturbed by the brake rotor (not shown) or wheel mounting flange 4 under a condition where the brake rotor is secured on the wheel hub 2 during the assembling step of the wheel bearing apparatus. Thus, it is possible to simply secure the outer member 10 to the knuckle (not shown) and accordingly improve the assembling workability.

The wheel hub 2 is formed, on its outer circumference, with one (outer-side) inner raceway surface 2a. A cylindrical portion 2b extends from the inner raceway surface 2a. An inner ring 3 is press fit onto the cylindrical portion 2b, via a predetermined interference. The inner ring outer circumference is formed with the other (inner side) inner raceway surface 3a. The inner ring 3 is axially secured relative to the wheel hub 2 under a predetermined bearing pre-pressurized condition by plastically deforming the end of the cylindrical portion 2b radially outward.

The outer member 10 is integrally formed, on its outer circumference, with a body mounting flange 10b. The flange 10b is to be mounted on a body (not shown) of a vehicle. The outer member inner circumference includes double row outer raceway surfaces 10a, 10a, opposing the inner raceway surfaces 2a, 3a. Double row rolling elements (balls) 6, 6 are contained between the outer and inner raceway surfaces 10a, 10a and 2a, 3a under a condition where an initial contact angle α is applied. The balls 6, 6 are rollably held by cages 7, 7. Seals 8, 9 are mounted within annular space openings formed between the outer member 10 and the inner member 1. The seals 8, 9 prevent leakage of grease contained inside the bearing and the entry of rain water and dust from the outside into the bearing.

The wheel hub 2 is made of medium-high carbon steel including carbon of 0.40 to 0.80% by weight such as S53C. It is hardened by high frequency induction quenching so that a region, including the outer-side inner raceway surface 2a from the inner-side base 4b of the wheel mounting flange 4 that slidably seats the seal 8 forming a seal land portion, to the cylindrical portion 2b, is hardened to have a surface hardness of 58 to 64 HRC. The caulked portion 2c remains as is with a surface hardness of 25 HRC or less after forging.

The inner ring 3 is made of high carbon chrome steel such as SUJ2. It is hardened to its core by dip quenching to have a surface hardness of 58 to 64 HRC. The outer member 10 is made of medium-high carbon steel including carbon of 0.40 to 0.80% by weight such as S53C. The double row outer raceway surfaces 10a, 10a are hardened to have a surface hardness of 58 to 64 HRC.

Although the structure shown here is a wheel bearing apparatus of the so called third generation type, where the inner raceway surface 2a is directly formed on the outer circumference of the wheel hub 2, the present disclosure is not limited to only such a structure. It is possible to apply the present disclosure to, for example, a wheel bearing apparatus of the first or second generation type, where a pair of inner rings is press-fit onto the cylindrical portion of the wheel hub. Additionally, the wheel bearing apparatus may be used on a fourth generation type, where the inner raceway surfaces are directly formed on the outer circumferences, respectively, of the wheel hub and the outer joint member of the constant velocity universal joint.

As shown in the enlarged view of FIG. 2(a), the cross-section of the inner raceway surface 3a of the inner ring 3 is formed by two circular arcs with different radii of curvature. That is, the inner raceway surface 3a of the inner ring 3 includes one circular arc section with a radius of curvature r. The circular arc section with the radius of curvature r extends from a position near a contact point P contacting the ball 6 at an initial contact angle $\alpha$ to the raceway bottom. The other circular arc section has a radius of curvature r1. The radius of curvature r1 is smaller than the radius of curvature r. The circular arc section with the radius of curvature r1 extends from a point near the contact point P to the radially outer side. The initial contact angle $\alpha$ CaO be properly set at a range within 30° to 45° in accordance with load conditions of a vehicle and the bearing space.

As shown in FIG. 2(a) by cross-hatchings, the radius of curvature r is set larger than r1 and has a range of 1.05 d<2 r≤1.10 d (wherein "d" is a diameter of the ball 6), preferably 1.05 d<2 r≤1.08 d. The radius of curvature r1 is set with a range of 1.01 d≤2 r1≤1.05 d, preferably 1.03 d≤2 r1≤1.05 d. More concretely, the inner raceway surface 3a contacts the ball 6 at the contact point P, via the initial contact angle $\alpha$ and a predetermined pre-load level, during steady travel (straight advancing travel) of a vehicle. Also, the inner raceway surface 3a contacts the ball 6 at the contact point P0 where a moment load is applied to the wheel bearing apparatus, via the contact angle $\alpha 1$ and a predetermined pre-load level during curving or turning travel of the vehicle.

Generally, the moment load is applied to the bearing during curving travel of a vehicle. The initial contact angle $\alpha$ gradually increases to $\alpha 1$. If it is defined as $\alpha 1=\alpha+\Delta\alpha$, $\Delta\alpha$ will be 2 to 8° when the initial contact angle $\alpha$ is 30 to 45°. The contact angle $\alpha 1$ is varied more or less by a set pre-load level of the bearing and the diameter of the ball 6 etc.

As shown in FIG. 2(b), the cross-section of the outer raceway surface 10a of the outer member 10 is formed with two circular arcs with different radii of curvature r2, r3. The outer raceway surface 10a of the outer member 10 includes one circular arc section with a radius of curvature r2. The circular arc section with the radius of curvature r2 extends from a position near a contact point Q, contacting the ball 6 at an initial contact angle $\alpha$, to the raceway bottom. The other circular arc section has a radius of curvature r3. The circular arc section with the radius of curvature r3 extends from a point near the contact point Q to the inner circumference 10c of the outer member 10.

As shown in FIG. 2(b) by cross-hatchings, the radius of curvature r2 is set larger than r3 and has a range of 1.07 d<2 r2≤1.12 d (wherein "d" is a diameter of the ball 6), preferably 1.07 d<2 r2≤1.10 d. The radius of curvature r3 is set within a range of 1.03 d≤2 r3≤1.07 d, preferably 1.05 d≤2 r3≤1.07 d. More concretely, the outer raceway surface 10a contacts the ball 6 at the contact point Q, via the initial contact angle $\alpha$ and a predetermined pre-load level, during steady or straight travel of a vehicle. Also, the outer raceway surface 10a contacts the ball 6 at the inflection point Q0, where a moment load is applied via the contact angle $\alpha 1$ and a predetermined pre-load level, during curving travel of a vehicle.

According to the present disclosure, since the inner raceway surface 3a and the outer raceway surface 10a are formed with circular arc configurations, respectively, having radii of curvatures r, r1 and r2, r3 as well as the inflection points P0, Q0, respectively, of two different radii of curvature r, r1 and r2, r3 are set as having a relation $\alpha 1=\alpha+\Delta\alpha$, no excessive pre-load is caused during steady travel of a vehicle and deficiency of the pre-load is not caused during curving travel of a vehicle and accordingly a proper pre-load can be applied. The pre-load level is set at a range of 0 to 10 μm (at the contact points P, Q) during straight advancing travel and at a range of 10 to 50 μm (at the contact points P0, Q0) during curving travel. This makes it possible to assure the initially applied pre-load and thus prevent an increase of rolling resistance while suppressing an excessive pre-load during steady travel as well as to increase the pre-load level in accordance with an increase of moment load. Thus, this improves the durability of the bearing by increasing the bearing rigidity without adding any part during curving or turning travel of a vehicle.

Although it is shown that the double row raceway surfaces 2a, 3a and 10a, 10a of both the inner and outer members 1 and 10 are formed with circular arc sections with two radii of curvatures, it is preferable that at least the double row inner raceway surfaces 2a, 3a of the inner member, giving strong influences to the bearing rigidity and life, have two radii of curvatures r, r1. In addition, although it is not shown herein, similarly to the inner ring 3, the inner raceway surfaces 2a of the wheel hub 2, forming the inner member 1, is also formed by two circular arcs having different radii of curvatures and the inflection point P0 of the two different radii of curvature r, r1 is set as $\alpha 1=\alpha+\Delta\alpha$.

Next, the machining method of the raceway surfaces will be described with reference to the inner raceway surface 3a of the inner ring 3. Since the raceway surface, having a plurality of radii of curvatures, has been ground by a formed grinding wheel with the same configuration as that of the raceway surface, several kinds of the formed grinding wheels need be prepared in order to correspond raceway surfaces of different specifications having different sizes. On the contrary, according to the present disclosure, the raceway surface is machined by turning (cut by a tool of quenched steel) using a cemented carbide chip (not shown). The cemented carbide chip is supported movably both in radial and axial directions and positioned by the numerical control. Thus, it is possible to reduce the manufacturing cost including administrative cost.

Furthermore, since it is impossible to perform the grinding of the raceway surface merely by oscillating the grinding wheel in the super finishing, the raceway surfaces are machined according to the present disclosure by using a so-called elastomeric grinding wheel formed of elastomer such as rubber mingled with abrasive grains exposed from the surface of the elastomer. Since the elastomeric grinding wheel can properly deformed corresponding to the configuration of the raceway surface formed of a plurality of radii of curvatures, it is possible to achieve a desired finished surface without adding any deformation to the raceway surface by oscillating the elastomeric grinding wheel along the configuration of raceway surface.

Figure 3:
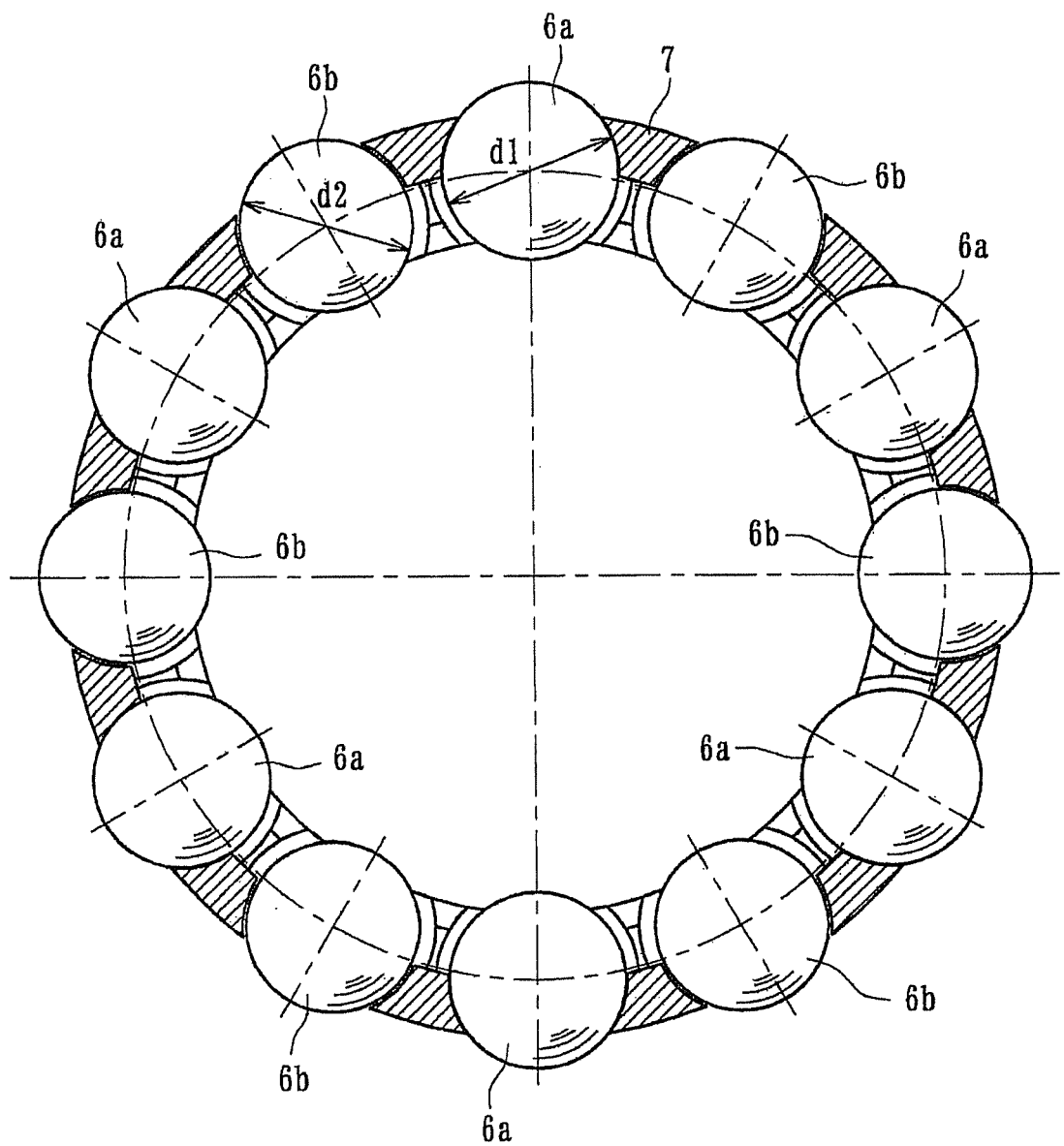
FIG. 3 is a front elevation view of a second embodiment of a vehicle wheel bearing apparatus illustrating one of the bearing ball rows.
Figure 4:
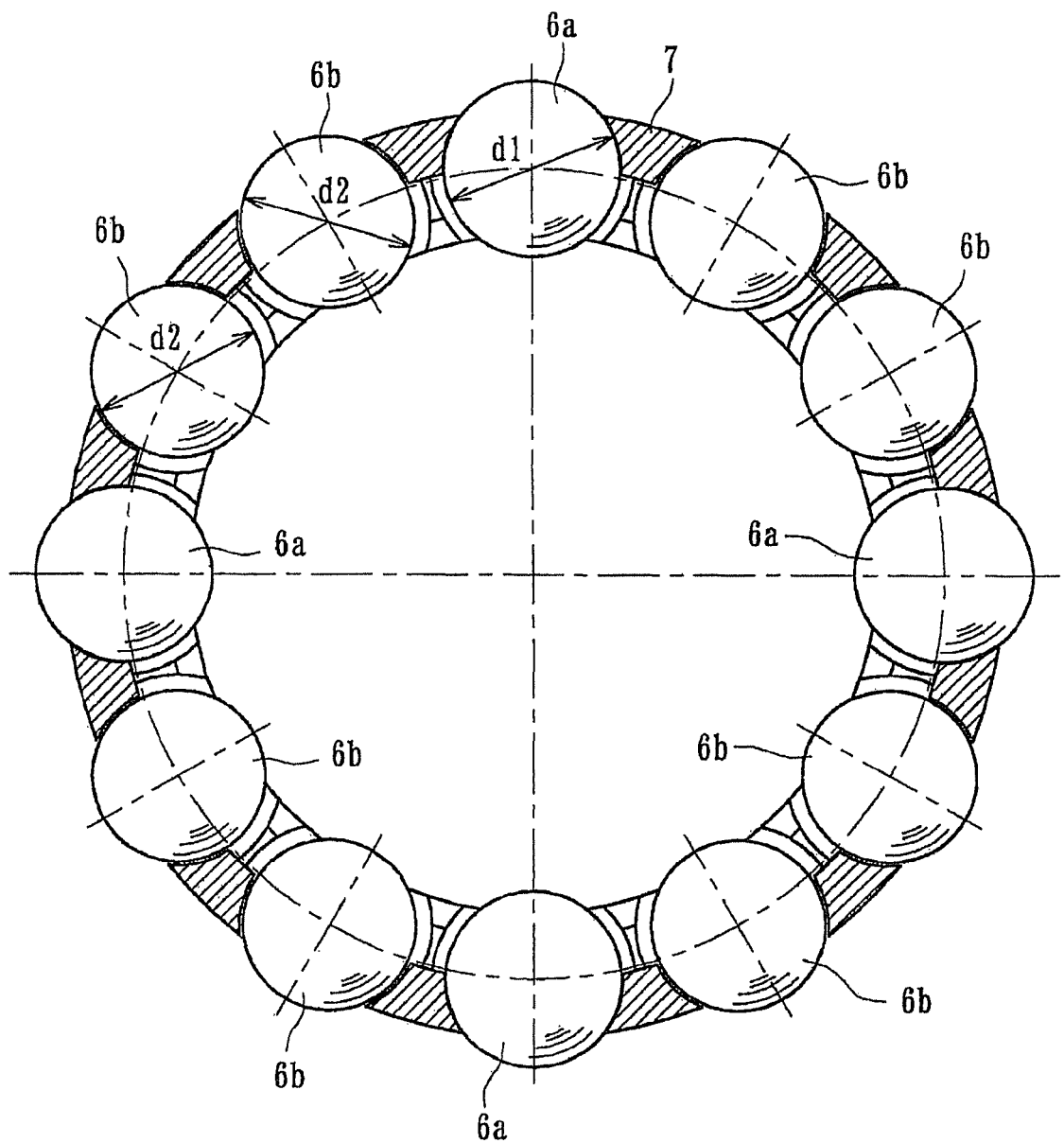
FIG. 4 is a front elevation view of one modification of FIG. 3.
Figure 5:
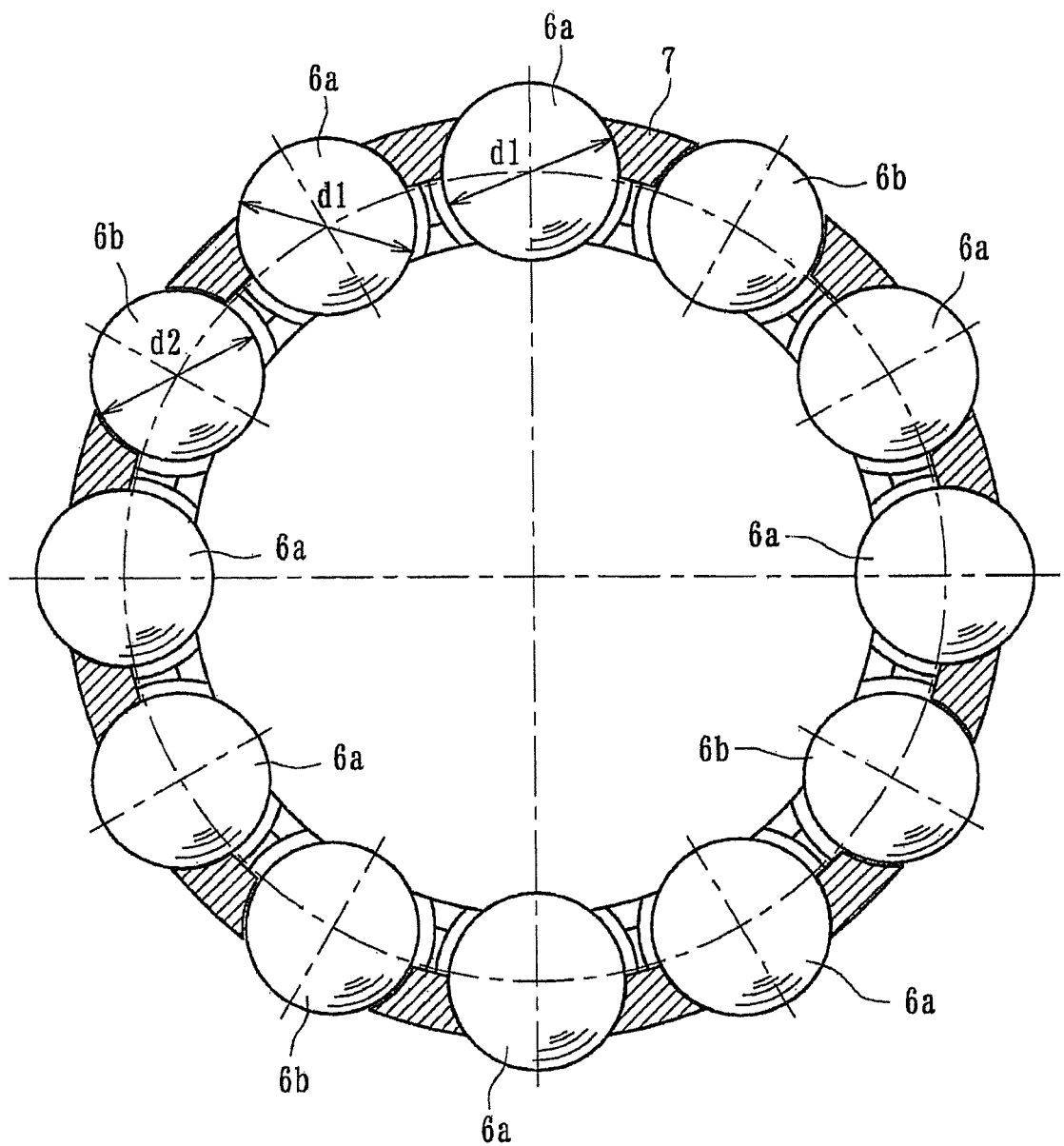
FIG. 5 is a front elevation view of another modification of FIG. 3.

FIG. 3 is a front elevation view of a second embodiment of a vehicle wheel bearing apparatus with one of the bearing ball rows. FIG. 4 is a front elevation view of one modification of FIG. 3. FIG. 5 is a front elevation view of another modification of FIG. 3. This embodiment is basically different from the first embodiment only in a structure of the balls. Accordingly, the same reference numerals are used to identify parts in this embodiment having the same functions as those of the first embodiment.

In this embodiment, each of the ball rows 6, 6 includes larger diameter balls 6a and smaller diameter balls 6b. The balls 6a, 6b are alternately arranged in a regular fashion. Accordingly, the radial load is only supported by the larger diameter balls 6a during straight advancing travel of a vehicle where mainly radial load is loaded on the bearing. Thus, the rolling resistance of balls and therefore the rotational torque of the bearing can be reduced.

On the other hand, an axial load is supported by the bearing in addition to the radial load during curving travel of the vehicle. Here, both the larger diameter balls 6a and the raceway surface contacting with the larger diameter balls 6a are elastically deformed. The load is also transferred to the smaller diameter balls 6b. Accordingly, the load is supported by all the balls 6 (not only by balls 6a but also by balls 6b) of one row. Thus, substantially the same bearing life as that of the prior art bearings can be obtained. Accordingly, it is possible to prevent an increase of the rolling resistance while assuring the initially applied pre-load and suppressing an excessive pre-load in addition to effects afforded by the raceway surfaces formed by circular arcs of two different radii of curvature. Furthermore, it is possible to provide a wheel bearing apparatus that can increase the pre-load level during curving travel of the vehicle where the moment load is applied to the bearing and reduce the rotational torque of the bearing during straight advancing travel of the vehicle without suffering from the influence of the variation in machining and improve the bearing life during curving travel.

The difference of diameter $\Delta d$ between the larger diameter balls 6a and the smaller diameter ball 6b (i.e. $\Delta d=d1-d2$) is set at $\Delta d \geq 5$ μm, preferably $\Delta d=5-10$ μm. If $\Delta d$ is less than 5 μm, it is believed that the load would be applied to the small diameter balls 6b, due to elastic deformation of the larger diameter balls 6a and the raceway surface, during straight advancing travel of the vehicle. Thus, effective reduction of rotational torque of the bearing cannot be expected. On the other hand, if $\Delta d$ exceeds 10 μm, it is believed that the load would not be supported by the small diameter balls 6b even though the larger diameter balls 6a and the raceway surface are elastically deformed during curving travel of the vehicle. Thus, the bearing life would be detracted.

Although it is shown, for example, where the larger diameter balls 6a and the smaller diameter balls 6b are alternately arranged, the present disclosure is not limited to such an example. For example the present disclosure can be applied to an arrangement where the chain is a larger diameter ball 6a—smaller diameter balls 6b, 6b—a larger diameter ball 6a as shown in FIG. 4. Another arrangement is where the chain is larger diameter balls 6a, 6a—a smaller diameter ball 6b—larger diameter balls 6a, 6a, shown in FIG. 5. These arrangements enable increased freedom of the design of the wheel bearing so that the bearings can satisfy the frequency of straight advancing travel and curving travel of a vehicle or a relationship between the loading condition and the loading capacity of the bearing.

When ceramic is used as the material of double row balls 6, 6, the contact ellipse of the ceramic balls is reduced since their rigidity is high. Accordingly, although it is possible to reduce the rotational torque of the bearing by replacing all the double row steel balls with ceramic balls, the manufacturing cost of the bearing will be increased, since the ceramic balls are more expensive than the steel balls. However, it is possible to achieve a reduction of the rotational torque of the bearing and an improvement of the bearing life without much increase in the manufacturing cost by replacing only the steel balls of the inner side row, which receives a large applied load when the moment load is loaded onto the bearing, with ceramic balls.

It is also possible to reduce the rotational torque of the bearing by alternately arranging the double row balls with ceramic balls and steel balls of same size in a regular fashion. As described above, similarly to the structure where the balls 6 of one ball row are formed by the larger diameter balls 6a and the smaller diameter balls 6b, it is possible to reduce the rotational torque of the bearing and improve the bearing life by replacing the larger diameter balls 6a with ceramic balls.

Figure 6:
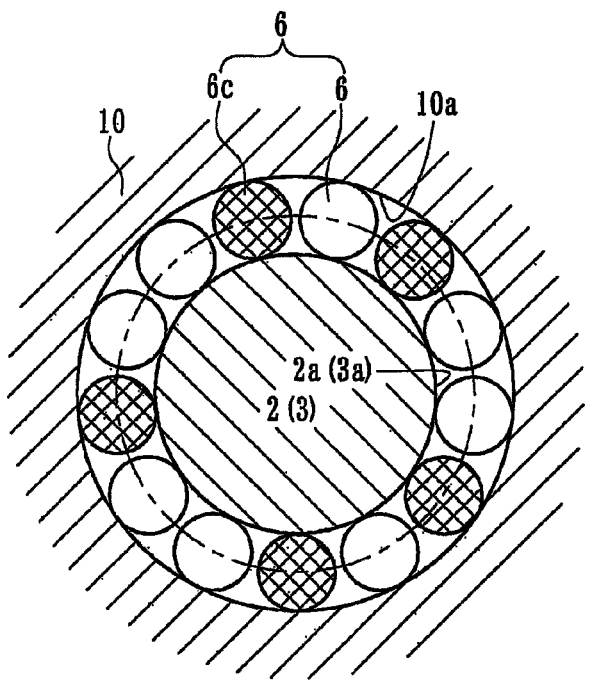
FIG. 6 is a front elevation view of a third embodiment of a vehicle wheel bearing apparatus illustrating one of the bearing ball rows.
Figure 7:
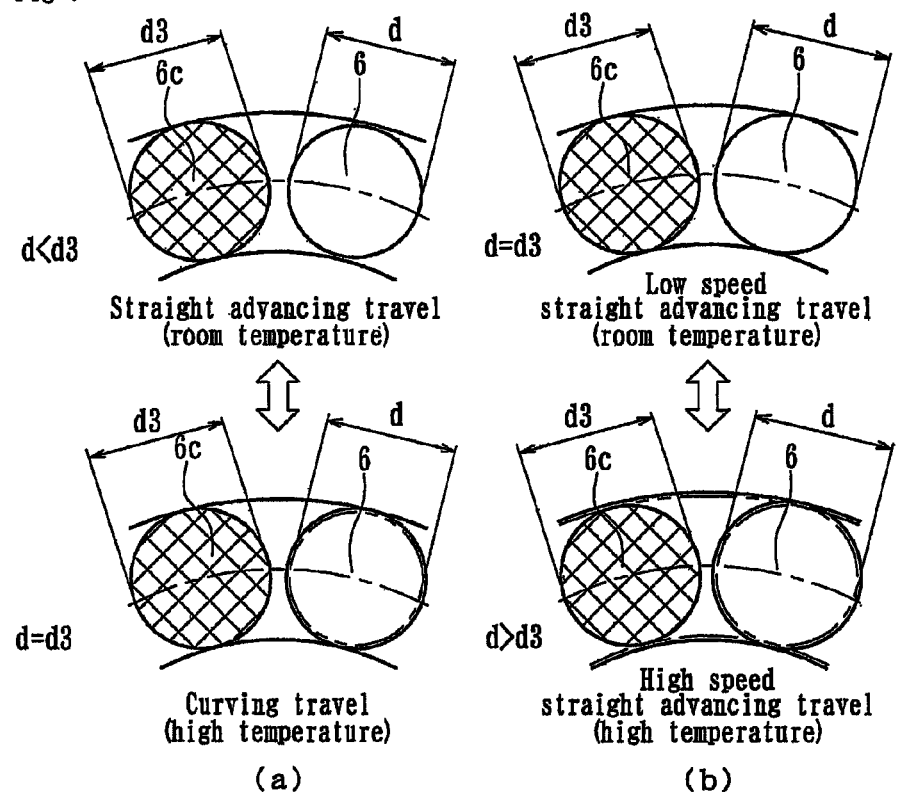
FIG. 7(a) is an explanatory view of actions during a straight advancing travel and a curving travel of a vehicle.
FIG. 7(b) is an explanatory view of actions during a low speed straight advancing travel and a high speed straight advancing travel of a vehicle.
Figure 8:
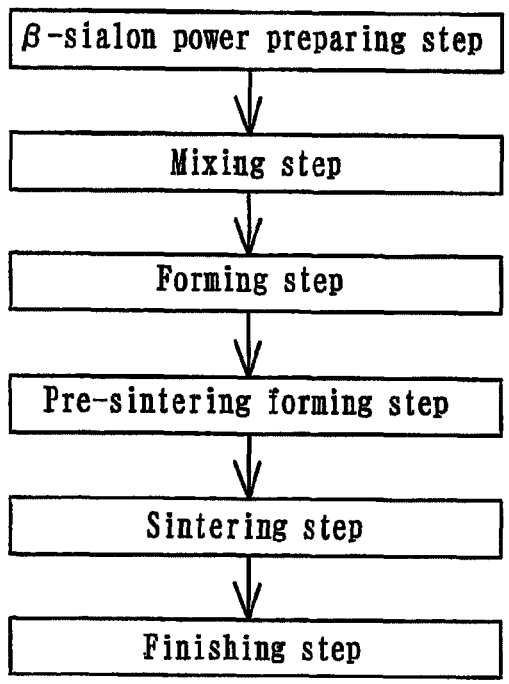
FIG. 8 is an explanatory view of manufacturing steps of ceramic balls.
Figure 9:
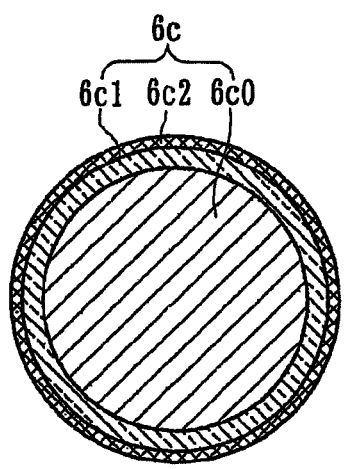
FIG. 9 is a schematic view of a cross-section of a ceramic ball.
Figure 10:
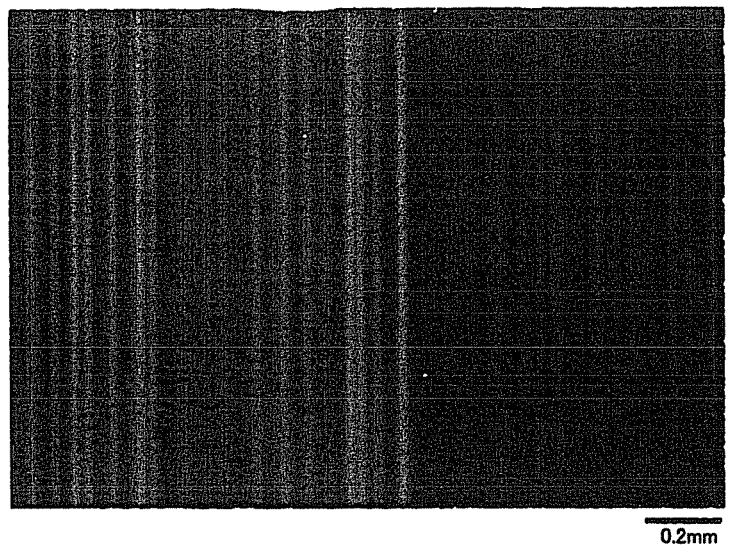
FIG. 10 is a photograph of a cross-section of a test piece for observation of the ceramic ball taken using inclined beams of an optical microscope.
Figure 11:
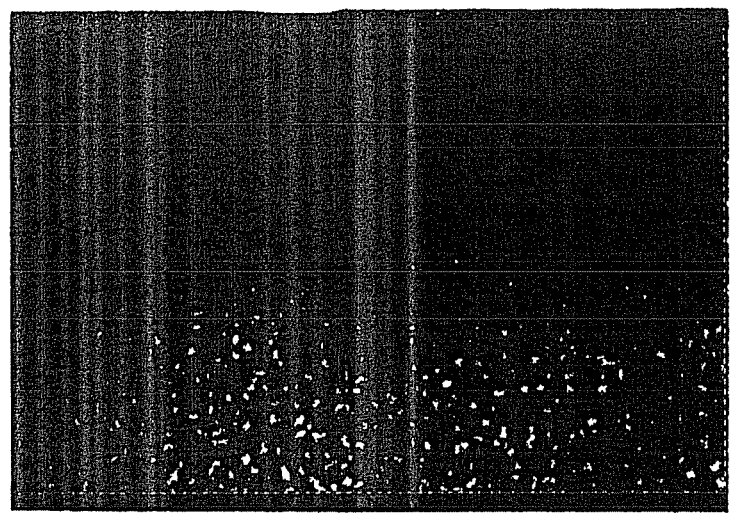
FIG. 11 is a photograph of one example of an image of the photograph of FIG. 10 binary processed by brightness thresholds using an image processing software.
Figure 12:
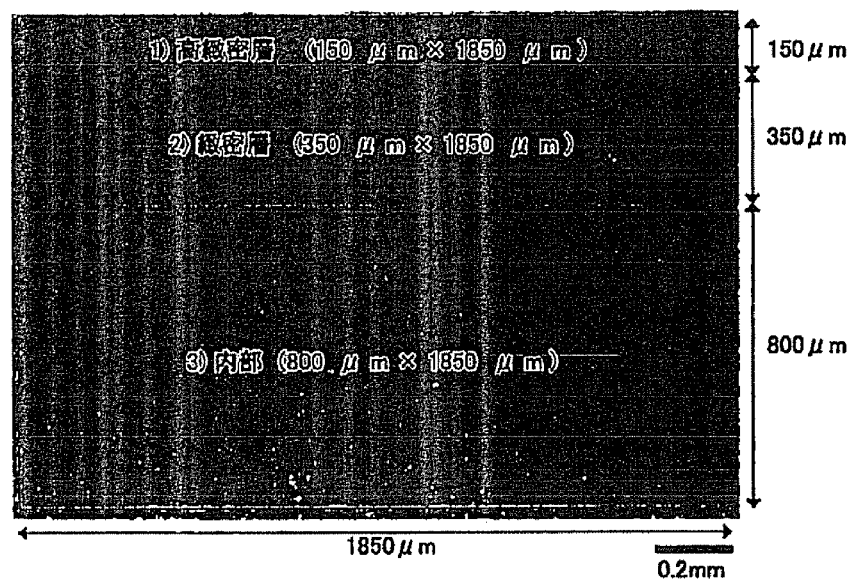
FIG. 12 is an explanatory view of a region to be image processed while the photograph of FIG. 10 is binary processed by brightness thresholds using an image processing software.

FIG. 6 is a front elevation view of a third embodiment of a vehicle wheel bearing apparatus showing one of the bearing ball rows. FIG. 7(a) is an explanatory view of actions during straight advancing travel and curving travel of a vehicle. FIG. 7(b) is an explanatory view of actions during a low speed straight advancing travel and a high speed straight advancing travel of a vehicle. FIG. 8 is an explanatory view of manufacturing steps of ceramic ball. FIG. 9 is a schematic view of a cross-section of a ceramic ball. FIG. 10 is a photograph of a cross-section of a test piece for observation of the ceramic ball using inclined beams of an optical microscope. FIG. 11 is a photograph of one example of an image of the photograph of FIG. 10 binary processed by brightness thresholds using an image processing software. FIG. 12 is an explanatory view of a region to be image processed while the photograph of FIG. 10 is binary processed by brightness thresholds using an image processing software. This embodiment is basically different from the first embodiment (FIG. 1) only in a structure of the balls. Accordingly, the same reference numerals are used to identify parts of this embodiment having the same functions as those of the first embodiment.

As shown in schematic view in FIG. 6, the arrangement of the double row balls 6, 6 of this embodiment includes a mixture of steel balls 6, made of high carbon chrome steel such as SUJ2, and ceramic balls 6c (shown by cross-hatchings). In this embodiment, the ceramic balls 6c are made of a sintered body of β-sialon. Since the manufacturing cost of ceramics formed of silicon nitride or sialon etc. is more expensive than steel, a sintered body formed of β-sialon has been marked recently as a structural elements for rolling bearing (see e.g. Japanese Laid-open Patent Publication Nos. 91272/2004, 75652/2005 and 194154/2005).

In this embodiment the β sialon sintered body is formed of sintered material including β-sialon as a primary ingredient having a composition formula of $Si_6-zAl_zO_zN_8-z$ and satisfying $0.1 \leq z \leq 3.5$ and the remainder of impurities. The impurities include irreversible impurities derived from raw materials or mingled during manufacturing steps.

The ceramic balls 6c may be formed of sintered material including β-sialon as a primary ingredient having a composition formula of $Si_6-zAl_zO_zN_8-z$ and satisfying $0.1 \leq z \leq 3.5$ and the remainder of sintering assistant and irreversible impurities. Thus, it is possible to select, as the sintering assistant, one or more of magnesium (Mg), aluminum (Al), silicon (Si), titanium (Ti), and oxides, nitride and oxidative nitride. It is preferable that the sintering assistant is 20% by weight or less.

Although it is possible to manufacture sintered body having a variety of compositions where the value of "z" (hereinafter referred to as "z-value") is 0.1 or more, in general, the surface hardness giving a large influence to the rolling fatigue life does not substantially vary in a z-value range of 4.0 or less where the sintered body can be easily manufactured. However after having investigated in detail a relationship between the rolling fatigue life of the ceramic balls $6c$ having β-sialon as a primary ingredient and the composition of β-sialon, it has been found that the rolling fatigue life of the ceramic balls $6c$ including a sintered body having β-sialon as a primary ingredient mentioned later is largely detracted if the z-value exceeds 3.5.

In particular, the rolling fatigue life is substantially constant in a z-value range of 0.1 to 3.5. The ceramic ball $6c$ will be fractured with peeling being generated on its surface if the servicing time duration of the rolling bearing exceeds a predetermined time. On the other hand, the ceramic balls $6c$ tends to be worn if the z-value exceeds 3.5. Thus, the rolling fatigue life is largely detracted. That is, it is clearly revealed a phenomenon that the rolling fatigue life is largely detracted if the z-value exceeds 3.5.

Table 1 shows a comparison of characteristics of silicon nitride, high carbon chrome steel (SUJ2) and β-sialon forming the material of the balls $6$, $6c$. As can be seen from this Table 1, the Young's modulus and surface hardness of sintered body of silicon nitride and β-sialon are higher than those of high carbon chrome steel (SUJ2) and the coefficient of linear expansion is extremely small. That is, it is possible to obtain a high rigidity and suppress the amount of dimensional variation of the balls when the bearing temperature is elevated if the sintered body of silicon nitride or β-sialon is adopted as the material of the double row balls $6$, $6$.

TABLE 1

| Characteristics | β-sialon sintered body | Silicon nitride | SUJ 2 |
| --- | --- | --- | --- |
| Density (g/cc) | 3.17 to 3.23 | 3.2 | 7.8 |
| Young's modulus (GPa) | 250 to 270 | 310 | 210 |
| Poisson's ratio | 0.29 | 0.26 | 0.3 |
| Fracture toughness (MPa · √m) | 3.6 to 3.9 | 6 | 15 |
| Surface hardness (Hv) | 1360 to 1485 | 1500 | 800 |
| Coefficient of linear expansion × $10^6$ (1/° C.) | 3.0 | 2.9 | 12.5 |

The applicant has noticed that the ceramic ball is different in the characteristics including coefficient of linear expansion from ordinary steel ball. Thus, it is possible to provide a wheel bearing apparatus that can suppress the rolling resistance during straight advancing travel of a vehicle by arranging balls $6$, $6$ of at least one ball row in a mixed manner of steel balls $6$ and ceramic balls $6c$. This improves the bearing life by increasing the rigidity of the bearing during curving travel or turning of a vehicle.

The diameter of the steel ball $6$ is "d" and the diameter of the ceramic ball $6c$ is "d3". The difference in diameter is "Δd" (=d3−d). When the larger diameter ball (i.e. ceramic ball) and the smaller diameter ball (i.e. steel ball) remain in an initial condition (d<d3), the load is supported only by the ceramic balls $6c$ in a time duration from the stopped condition of a vehicle to the straight advancing travel of a vehicle (less than 100 km/h). The load applied to the bearing and the temperature elevation are small the initial diameter difference Δd (=d3−d) is set within a range of 5 to 10 μm as shown in FIG. 7 (a). Since the amount of elastic deformation of the ceramic balls $6c$, caused when the load is applied to the bearing, is smaller than that of the steel balls $6$, it is possible to reduce the rotational torque of bearing while suppressing the rolling resistance and improve the bearing life while suppressing the temperature elevation of the bearing and thus suppressing the degradation of grease.

The steel balls $6$ expand larger than the ceramic balls $6c$, due to a difference in the coefficient of linear expansion, when a large moment load is applied to the bearing and the temperature of the bearing is largely elevated during curving travels. Thus, the initial diameter difference Δd is diminished (d≈d3). Accordingly, the load is supported by both the steel balls $6$ and ceramic balls $6c$ and the rigidity of the bearing can be increased.

The diameter difference Δd of the steel ball $6$ and ceramic ball $6c$ will be substantially 1 μm/10° C., in the case, for example, of a ½ inch nominal diameter of the ball $6$. That is, a range of temperature elevation of 50 to 100° can be allowed by setting the diameter difference Δd (=d3−d) within a range of 5 to 10 μm. It is difficult to obtain desirable effect if the diameter difference Δd is less than 5 μm. The load would be supported only by ceramic balls $6c$ in all modes if the diameter difference Δd exceeds 10 μm.

In addition, the ratio of the mixture of the steel balls $6$ and the ceramic balls $6c$ is preferably set within a range of 3:7 to 7:3 including 1:1 although it is properly selected based on types of vehicles or specification of bearings such as odd number or even number of balls. If the ratio of the mixture of the steel balls $6$ and the ceramic balls $6c$ is 2:8 or less, the manufacturing cost of the bearing is increased. If it is 8:2 or more, improvement of the reduction of rotational torque of the bearing and an increase in rigidity cannot be expected. It is possible to obtain an optimum durability corresponding to loading conditions by varying the ratio of the mixture so that the inner side ball row, subjected to severe loads, has the mixture ratio of 3:7 and the outer side ball row has the ratio of 7:3.

If it is set so that the steel balls $6$ and the ceramic balls $6c$ have no initial diameter difference therebetween, as shown in FIG. 7 (b), a substantial diameter difference is not caused therein in time duration from a stopped condition to a straight advancing travel of a vehicle (d≈d3). Thus, the load is supported by both the steel balls $6$ and the ceramic balls $6c$ while keeping the initial condition. On the other hand, the diameters of the steel balls $6$ and the ceramic balls $6c$ are varied by a relationship (d>d3) due to a difference of the coefficient of linear expansion of them when the vehicle speed exceeds 100 km/hour. Accordingly, the load is supported only by steel balls $6$. Thus, it is possible to reduce the rotational torque of the bearing while keeping the initial bearing pre-load and suppressing the rolling resistance.

Next, a method for manufacturing the ceramic balls $6c$ will be described. In methods for manufacturing the ceramic balls $6c$, it is usual to adopt a pressured sintering method (method for carrying out sintering in general under a pressure 10 MPa or more) such as "Hot Isostatic Press: HIP" or "Gas Pressured Sintering: GPS" for the purpose of suppressing the generation of faults detracting the rolling fatigue life. However, it is believed in the manufacturing method adopting the pressured sintering method that the manufacturing cost of the sintered body would be increased and that an affected abnormal layer would be formed on a surface of the ceramic ball. Accordingly, the manufacturing cost is further increased to remove the affected abnormal layer. On the contrary, if the pressured sintering method is not adopted, the porosity of the ceramic balls is increased and thus problems causing faults in the ceramic balls and detracting the rolling fatigue life of them would arise.

For solving these problems, it is possible, according to the present disclosure, to manufacture, at a low cost, the ceramic balls that can stably assure sufficient durability by sintering formed bodies of β-sialon under a pressure lower than 1 MPa or less. That is, as shown in FIG. 8, a β-sialon powder preparing step is carried out first. In this step, the β-sialon powder can be manufactured at a low cost, for example, by a manufacturing step adopting the sintering synthetic method.

A mixing step is carried out to mix the β-sialon powder, prepared in the β-sialon powder preparing step, with added sintering assistant. This mixing step can be omitted if the sintering assistant is not added.

A forming step is carried out to form the mixture of the β-sialon powder and the sintering assistant, a formed body having substantially the same configuration as the ceramic ball. More particularly, bodies each having the substantially same configuration as the ceramic balls are formed by applying forming methods such as press-forming, casting, drawing, roll-corning etc. to the mixture of the β-sialon powder and the sintering assistant.

A pre-sintering forming step is carried out. This pre-sintering forming step is a step to form the formed body so that it has a configuration substantially the same configuration as a desired ball configuration after being sintered by modifying a surface of the formed body. More particularly, the configuration, having a more approximated configuration to the ball configuration, can be obtained by applying a method of green body forming. This pre-sintering forming step can be omitted if it is possible to have a formed body configuration having a more approximated configuration to the ball configuration in the forming step.

A sintering step is carried out where the formed body is sintered under a pressure of 1 MPa or less. More particularly, a substantially spherical sintered body can be obtained by heating the formed body using heating methods such as a heater heating, an electromagnetic wave heating etc. The sintering is carried out by heating the formed body to temperatures in a range of 1550° to 1800° in an inert gas atmosphere or mixed gas atmosphere of nitrogen and oxygen. This suppresses the decomposition and structural change of β-sialon. In this sintering step of a formed body including β-sialon, the sintering is carried out in a range of 1550° to 1800°. However, since it is difficult to promote dense sintering at a temperature lower than 1550°, the formed body is preferably sintered at a temperature higher than 1550°. On the contrary since it is believed that mechanical characteristics of the sintered body would be detracted by change of β-sialon grain to a coarse grain if the sintering temperature exceeds 1800°, it is preferable to carry out the sintering at a temperature lower than 1800°. In addition although it is possible to use helium, neon, argon or nitrogen as the inert gas, nitrogen is preferable in view of reduction of the manufacturing cost.

A finishing step is carried out where the ceramic balls $6c$ are finished by processing the surfaces of sintered bodies made in the sintering step and removing regions including the surfaces. More particularly, the surfaces of sintered bodies are ground or lapped to have desired configuration, dimension or surface roughness.

As schematically shown in FIG. 9, the sintered body (i.e. ceramic ball $6c$) formed by the method of the disclosure described above is formed with a dense layer $6c1$. This dense layer $6c1$ is formed in a region having a thickness of 500 μm from the surface of the sintered body. It has a higher denseness than that of the inside portion $6c0$ of the sintered body. The square ratio of a white region of a cross-section of the dense layer $6c1$ observed as white when observed by inclined beams of an optical microscope is set at 7% or less. That is, the sintered body is formed with the dense layer $6c1$ of low porosity (high density). In addition the sintered body is formed with a high dense layer $6c2$. This high dense layer $6c2$ is formed in a region having a thickness of 150 μm from the surface of the sintered body. It has a higher denseness than that of the other region in the dense layer $6c1$. The square ratio of a white region of a cross-section of the high dense layer $6c2$ observed as white when observed by inclined beams of an optical microscope is set at 3.5% or less. Accordingly, it is preferable that the thickness of the sintered body $6c$ to be removed in the finishing step is 150 μm or less especially in the region corresponding to a rolling surface. This further improves the rolling fatigue life of the ceramic ball $6c$ while retaining the high dense layer $6c2$.

The applicant made a deep groove ball bearing having ceramic balls formed from β-sialon sintered material having various z-values mentioned above. Tests were performed to verify a relationship between the z-values and the rolling fatigue life (durability). The process of the test is as follows.

First, a method for making the bearing presented to the test will be described. First, β-sialon powder made by sintering synthetic method to have z-values of 0.1 to 4.0 was prepared. Ceramic balls with z-values of 0.1 to 4.0 were formed in accordance with a method similar to the manufacturing method of the ceramic balls described in FIG. 8. More particularly, β-sialon powder micronized to submicron, aluminum oxide (Sumitomo Chemicals, Co. Ltd.: AKP30) and yttrium oxide (H. C. Strarck, Co. Ltd.: Yttrium oxide grade C) as sintering assistant were wet mixed with each other using a ball mill. Corning powder was made by a spray dryer corning method. The corning powder was molded into spherical bodies using a mold and further formed to final spherical bodies in accordance with a cold isostatic pressing (CIP).

After having continuously performed the normal pressure sintering the formed bodies as a primary sintering, sintered bodies were manufactured by performing the HIP process in a nitrogen atmosphere of 200 MPa. Then the sintered bodies were lapped to obtain ⅜ inch ceramic balls (JIS G5). Then a deep groove ball bearing (JIS 6206) was made by combining with a separately prepared bearing ring formed of bearing steel (JIS SUJ2). That is, steel balls having the z-value "0" were made by the same method as that for making the ceramic balls and similarly assembled into the deep groove ball bearing (Comparative example A in Table 2).

Test conditions will be described. The deep groove ball bearing (JIS 6206) made in accordance with the method previously described were presented to a fatigue test by driving the bearing under conditions of maximum contact surface pressure (Pmax): 3.2 GPa, bearing rotational speed: 2000 rpm, lubrication: circulating supply of turbine oil VG 68 (cleaning oil), and test temperature: room temperature. Vibration under the driven bearing was monitored by a vibration detecting apparatus. The test was stopped when the value of vibration would exceed a predetermined value due to the generation of damage in the balls. The time duration from the start of the drive of the bearing to the stop of the drive was recorded as the life of the bearing. The bearing was disassembled after the test and confirmed a damaged condition of each ball. The result of which is shown in Table 2.

TABLE 2

| | Comparative example A | Embodiment | | | | |
| --- | --- | --- | --- | --- | --- | --- |
| | | A | B | C | D | E |
| z-value | 0 (Silicon nitride) | 0.1 | 0.5 | 1 | 1.5 | 2 |

TABLE 2-continued

| Life ratio | 1 | 1.05 | 1.05 | 1.05 | 1.01 | 0.99 |
|---|---|---|---|---|---|---|
| Damage Configuration | Flaking | Flaking | Flaking | Flaking | Flaking | Flaking |

| | Embodiment | | | Comparative example B | Comparative example C |
|---|---|---|---|---|---|
| | F | G | H | | |
| z-value | 2.5 | 3 | 3.5 | 3.8 | 4 |
| Life ratio | 0.95 | 0.9 | 0.74 | 0.12 | <0.05 |
| Damage Configuration | Flaking | Flaking | Flaking (Slight wear) | Flaking (Wear) | Wear |

In Table 2, the life in each of the embodiments and comparative examples is expressed by a ratio (life ratio) relative to the life (1) in Comparative example A (silicon nitride). Also in an item of "damage configuration" of Table 2, a term "flaking" is used when flaking is generated on a surface of the ball and a term "wear" is used when the test was stopped due to wear on a surface of the ball without the generation of flaking.

In Table 2, it is shown that the balls of embodiments A to H having z-value of 0.1 or more and 3.5 or less have life that is not inferior to that of the Comparative example A. In addition, the damage configuration of them was also "flaking" similar to that of silicon nitride. On the contrary in Comparative example B where the z-value exceeds 3.5 and is out of the range of the present disclosure, the life is substantially detracted and wear is found on balls. That is, it is supposed that the wear would give influence to the balls and detract their lives. Furthermore in Comparative example C, having a z-value of 4.0, it is found that the wear of the balls would proceed in an extremely short time and thus the life of the bearing would be also extremely detracted.

Accordingly, it is found that the durability of a rolling bearing including balls formed of β-sialon sintered material is substantially same as that of a rolling bearing including balls formed of sintered material of silicon nitride in a z-value range of 0.1 or more and 3.5 or less. On the contrary balls tend to be worn if the z-value exceeds 3.5 and thus the rolling fatigue life will be extremely detracted. The damage configuration of balls formed of β-sialon is changed from "flaking" to "wear" if the z-value is further increased and thus the rolling fatigue life is extremely detracted. That is, it is possible to stably assure sufficient durability at low manufacturing cost by keeping the z-value within a range of 0.1 to 3.5.

In the embodiment H in table 2 where the z-value exceeds 3.5, slight wear is generated on balls and their lives are also detracted as compared with the embodiments A to G. From this it can be concluded that it is preferable to keep the z-value at 3.0 or less in order to stably assure a sufficient durability.

In addition from the results mentioned above it is preferable to keep the z-value at 2 or less and more preferably 1.5 or less in order to obtain the durability the same or more as that of the balls formed from silicon nitride. On the other hand, in view of easiness of manufacturing, the β-sialon sintered bodies, it is preferable to keep the z-value at 0.5 or more at which level it is possible to sufficiently expect reaction by self-heat generation.

A test for investigating a formed condition of the dense layer 6c1 and the high dense layer 6c2 in the cross-section of a ball of the present disclosure was carried out. The process of the test is as follows.

First, β-sialon powder ($Si_5Al_zON_7$; trade name "Melamix", Ismanjey Co. Ltd.) was prepared and a cubicle test piece of 10 $mm^3$ was made by a method similar to the manufacturing method described in FIG. 8.

The β-sialon powder micronized to submicron, aluminum oxide as sintering assistant (Sumitomo Chemicals, Co. Ltd.: AKP30), and yttrium oxide (H. C. Strarck, Co. Ltd.: Yttrium oxide grade C) were wet mixed with each other using a ball mill. Then corning powder was made by a spray dryer corning method. The corning powder was molded to spherical bodies using a mold and further formed to final spherical bodies in accordance with a cold isostatic pressing (CIP).

The cubicle test piece was made by heating the formed body to 1650° and sintering it in nitrogen atmosphere of 4 MPa. After having cut and then lapped the test piece by a diamond lapping machine, a cross-sectional surface for observation including the center of the cubic was formed by performing a mirror surface lapping by a chromium oxide lapping machine. The cross-sectional surface was observed by inclined beams of an optical microscope (Nikon Co. Ltd.: Microphoto-F)(A) and taken as an instant photograph (Fuji film Co. Ltd.: FP-100 B) at a magnification of 50 (×50). An image of the obtained photograph was taken into a personal computer using a scanner (definition: 300 DPI). Finally the square ratio of a white region of the cross-sectional surface was measured (binary separated threshold: 140) by performing the binary process of brightness threshold using an image processing software (Mitani shoji Co. Ltd.: WinROOF).

The results of test will be described. FIG. 10 is the photograph of the cross-section of the test piece for observation taken using inclined beams of the optical microscope. FIG. 11 is one example of an image of the photograph of FIG. 10 binary processed by brightness thresholds using an image processing software. FIG. 12 is a drawing of a region (evaluation region) to be image processed while the photograph of FIG. 10 is binary processed by brightness thresholds using an image processing software. In FIG. 10 the upside of the photograph is a surface side of the test piece and the top end is a surface of the test piece.

With reference to FIGS. 10 and 11 it is found that the test piece made by a manufacturing method similar to that for manufacturing the spherical body of the present disclosure has a region including its surface formed with a layer having a white region lesser than its inside portion. The image of the photograph is divided into three regions (i.e. a region within 150 μm from the outermost surface, a region over 150 μm and within 500 μm from the outermost surface and a region over 500 μm and 800 μm from the outermost surface) as shown in FIG. 12. The square ratio of the white region is calculated by performing an image analysis of every region and results of which are shown in Table 3 below. In Table 3 an average value and a maximum value of the white region and the square ratio in each of five visual fields obtained from five photographs taken at random defining each region shown in FIG. 12 as one visual field.

TABLE 3

| | Depth from outermost surface (μm) | Square ratio of white region (%) | |
|---|---|---|---|
| | | Average of five visual fields | Maximum value of five visual fields |
| 1) High dense layer | 150 | 1.2 | 3.5 |
| 2) Dense layer | 150 to 500 | 3.7 | 7.0 |
| 3) Inside portion | >500 | 18.5 | 22.4 |

As can be seen from Table 3, the square ratio of the white region in the region of the depth of which is within 500 μm from its surface is 3.7%. The square ratio of the white region in the region of the depth of which is within 150 µm from its surface is 1.2% although white region in the inside portion is 18.5% Thus, it is confirmed that the test piece is formed in its region including the surface with the dense layer and the high dense layer having lesser white region than the inside portion.

The corning powder was made by spray dryer corning method. The corning powder was molded to spherical bodies using a mold and further formed to final spherical bodies by pressing in accordance with the CIP method.

The formed body was processed by the green method so that it has a predetermined processing margin after sintering and sintered spherical body was manufactured by continuously sintering the formed body with heating it to 1650° in a nitrogen atmosphere at 0.4 MPa. A ⅜ inch ceramic ball (JIS G 5) was obtained by lapping the sintered spherical body. A deep groove ball bearing (JIS 6206) was manufactured by combining the ceramic balls with a separately prepared bearing ring formed of bearing steel (JIS SUJ2) (Comparative example A). The processing margin for lapping was 0.25 mm.

The deep groove ball bearing (JIS 6206) made in accordance with the method previously described was presented to a fatigue test by driving the bearing under conditions of max. contact surface pressure (Pmax): 3.2 GPa, bearing rotational speed: 2000 rpm, lubrication: circulating supply of turbine oil VG 68 (cleaning oil), and test temperature: room temperature. Vibration under the driven bearing was monitored by a vibration detecting apparatus. The test was stopped when the value of vibration would exceed a predetermined value due to the generation of damage in the balls. The time duration from the start of the drive of the bearing to the stop of the drive was recorded as the life of the bearing. The sample number was 15, respectively, in the embodiment examples and comparative examples and the durability was evaluated by calculating the $L_{10}$ life and using the life ratio relative to the comparative example A. The result of the test is shown in Table 4. The term "$L_{10}$ life" means a total number of rotation or a total time duration of rotation (when rotated at a constant speed) during a condition that when a group of bearings are driven under a same condition, 90% or more of them can rotate without causing damage due to rolling fatigue of material of bearings.

TABLE 4

| | Processing margin (mm) | $L_{10}$ life (time duration) | Life ratio |
| --- | --- | --- | --- |
| Embodiment A | 0.05 | 6492 | 3.19 |
| Embodiment B | 0.10 | 6387 | 3.14 |
| Embodiment C | 0.15 | 6404 | 3.15 |
| Embodiment D | 0.20 | 3985 | 1.96 |
| Embodiment E | 0.30 | 4048 | 1.99 |
| Embodiment F | 0.40 | 3945 | 1.94 |
| Embodiment G | 0.50 | 3069 | 1.51 |
| Embodiment H | 0.60 | 867 | 0.43 |
| Comparative example A | 0.25 | 2036 | 1.00 |

As can be seen from Table 4, it is understood that the bearing life of all embodiments is satisfactory in view of their manufacturing cost. The bearing life of the Embodiments D to G where the dense layer remains on the surface of each ball while keeping the processing margin 0.5 mm or less is about 1.5 to 2 times the bearing life of the Comparative example A. In addition the bearing life of the Embodiments A to C where the high dense layer remains on the surface of each ball while keeping the processing margin 0.15 mm or less is about 3 times the bearing life of the Comparative example A. Thus it is confirmed that the bearing including balls of the present disclosure is excellent in durability. It is found that the bearing life can be extended by retaining the dense layer on the surface of each ball while keeping the processing margin 0.5 mm or less. Life can be further extended by retaining the high dense layer on the surface of each ball while keeping the processing margin 0.15 mm or less.

Figure 13:
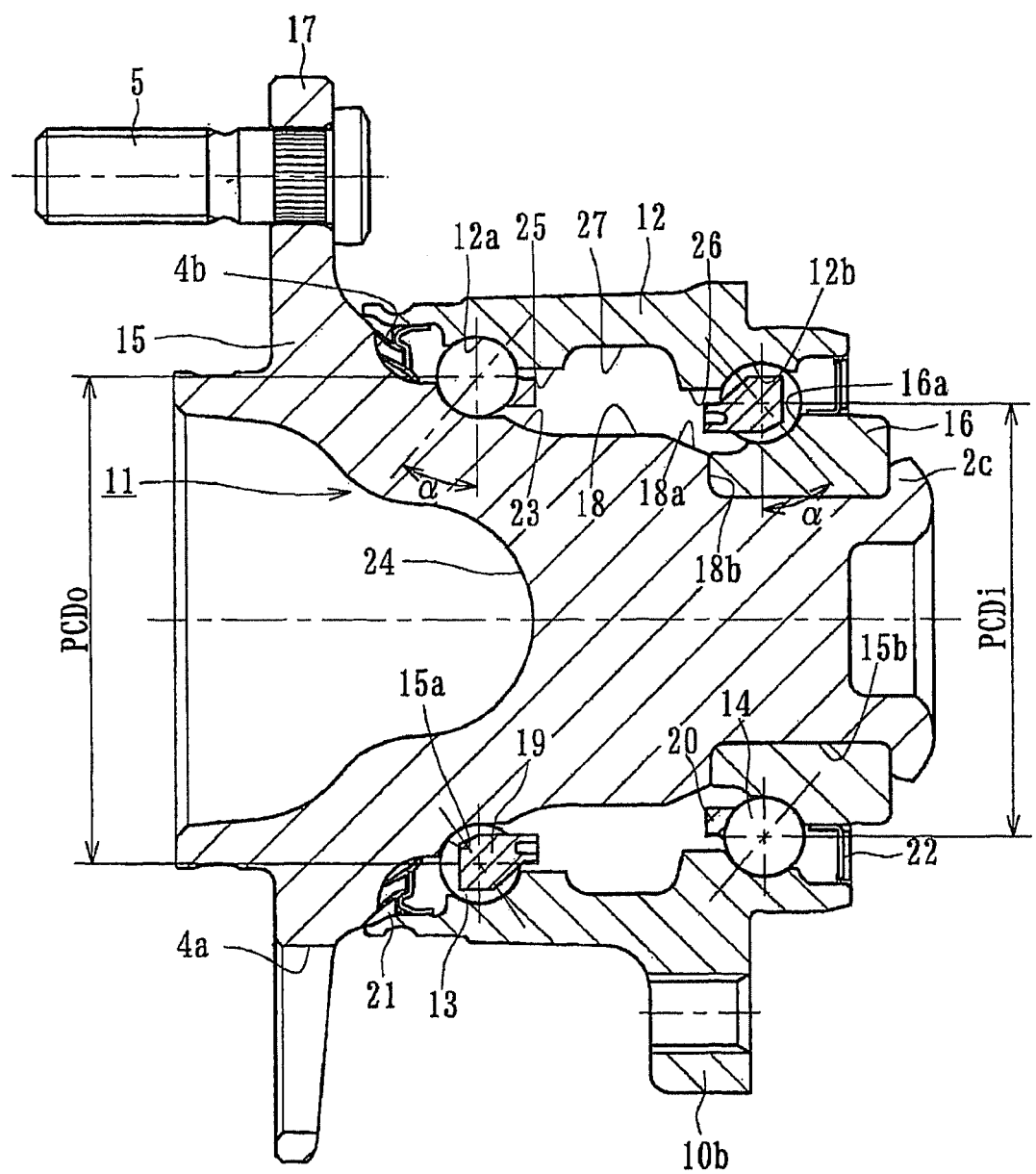
FIG. 13 is a longitudinal section view of a fourth embodiment of a vehicle wheel bearing apparatus.
Figure 14:
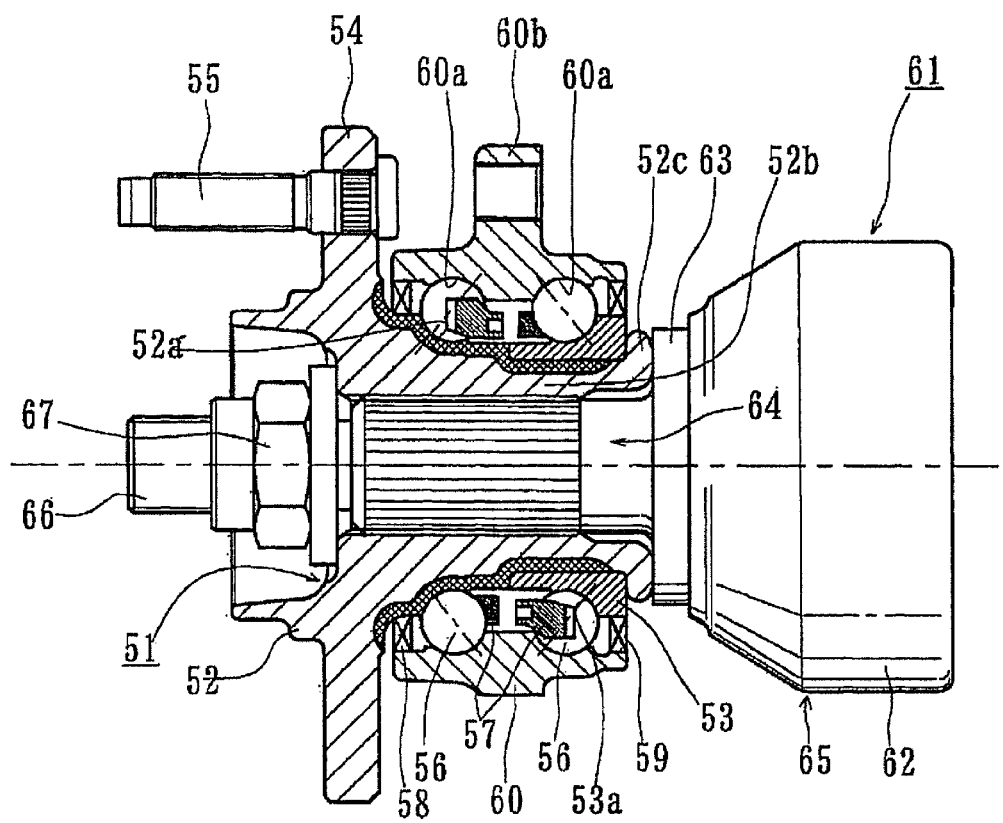
FIG. 14 is a longitudinal section view of a prior art vehicle wheel bearing apparatus.
Figure 15:
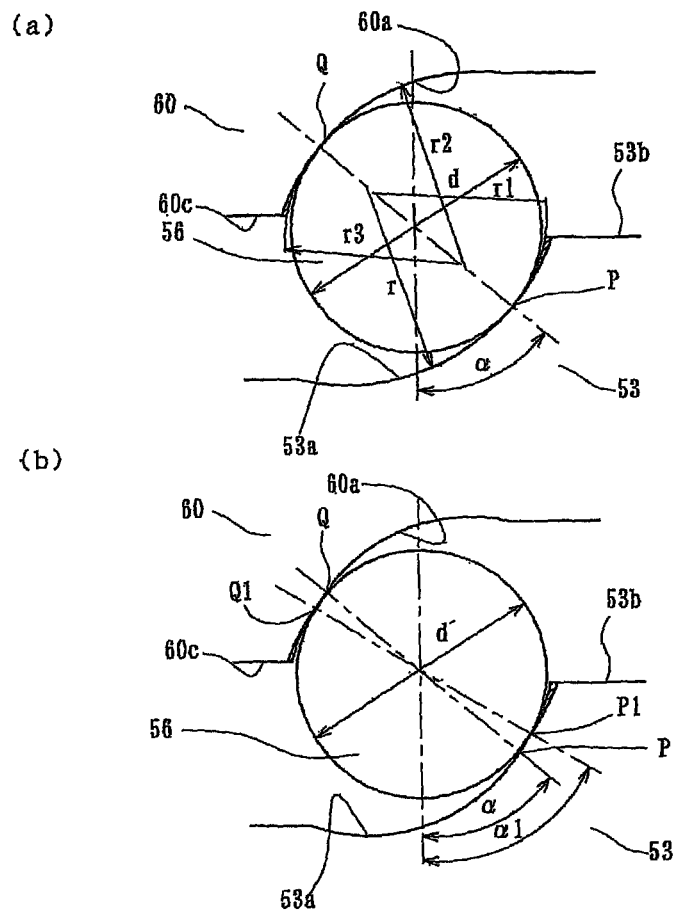
FIG. 15(a) is an enlarged explanatory view of FIG. 14 illustrating action during a straight advancing travel of a vehicle.
FIG. 15(b) is an enlarged explanatory view of FIG. 14 illustrating action during a curving travel of a vehicle.

FIG. 13 is a longitudinal section view of a fourth embodiment of a vehicle wheel bearing apparatus. This embodiment is basically different from the first embodiment only in the pitch circle diameter of double row balls. Accordingly, the same reference numerals are used to identify parts of this embodiment having the same functions as those of the first embodiment.

The vehicle wheel bearing apparatus of this embodiment is a third generation type used for a driven wheel. It includes an inner member 11, an outer member 12, and double row ball group 13,14, rollably contained between the inner and outer members 11, 12. The inner member 11 includes the wheel hub 15 and an inner ring 16 press fit onto the wheel hub 15, via a predetermined interference.

The wheel hub 15 is integrally formed with a wheel mounting flange 17 at its outer-side end. The wheel hub outer circumference includes one (outer side) inner raceway surface 15a. A cylindrical portion 15b extends from the inner raceway surface 15a through a shaft portion 18. Hub bolts 5 are arranged on the wheel mounting flange 17 equidistantly along the periphery. Circular apertures 4a are formed between the hub bolts 5.

The inner ring 16 is formed with the other (inner side) inner raceway surface 16a on its outer circumference. The inner ring 16 is adapted to be press-fit onto the cylindrical portion 15b of the wheel hub 15 to form a double row angular contact ball bearing of back-to-back duplex type. The inner ring 16 is axially secured with a predetermined bearing pre-load by a caulked portion 2c. The caulked portion 2c is formed by plastically deforming the end of the cylindrical portion 15b to form a so-called self-retain structure. The inner ring 16 and rolling elements 13, 14 are made of high carbon chrome steel such as SUJ2. They are hardened to their cores by dip quenching to have a surface hardness of 58 to 64 HRC.

The wheel hub 15 is made of medium-high carbon steel including carbon of 0.40 to 0.80% by weight such as S53C. It is hardened by high frequency induction quenching so that a region, including the inner raceway surface 15a from the inner side base 4b of the wheel mounting flange 17 to the cylindrical portion 15b, is hardened to have a surface hardness of 58 to 64 HRC.

The outer member 12 is integrally formed on its outer circumference with a body mounting flange 10b. The flange 10b is to be mounted on a knuckle (not shown). The outer member inner circumference includes outer and inner outer raceway surfaces 12a, 12b. The outer side outer raceway surface 12a opposes the inner raceway surface 15a of the wheel hub 15. The inner side outer raceway surface 12b opposes the inner raceway surface 16a of the inner ring 16. Double row balls 13, 14 are contained between the outer and inner raceway surfaces and are rollably held by cages 19, 20. A seal 21 and a slinger 22 are mounted within annular space openings formed between the outer member 12 and the inner member 11. The seal 21 and slinger 22 prevent leakage of grease contained in the bearing and the entry of rain water and dust from the outside into the bearing.

The outer member 12 is made of medium-high carbon steel including carbon of 0.40 to 0.80% by weight such as S53C. The double row outer raceway surfaces 12a, 12b are formed with a hardened layer to have a surface hardness of 58 to 64 HRC, by high frequency induction quenching. Although the structure shown here is a wheel bearing apparatus of a so called third generation type, where the inner raceway surface 15a is directly formed on the outer circumference of the wheel hub 15, the present disclosure is not limited only to such a structure. It is possible to apply the present disclosure, for example, to a wheel bearing apparatus of the first or second generation type, where a pair of inner rings is press-fit onto the cylindrical portion of the wheel hub. Additionally, the disclosure can be applied to a fourth generation type where the inner raceway surfaces are directly formed on the outer circumferences, respectively, of the wheel hub and the outer joint member of the constant velocity universal joint.

According to this embodiment a pitch circle diameter PCDo of the outer side ball group 13 is set larger than a pitch circle diameter PCDi of the inner side ball group 14 (PCDo>PCDi). The number of the outer side balls 13 is set larger than the number of the inner side balls 14. This makes it possible to make the size and weight of the wheel bearing apparatus light and compact by effectively using the bearing space and increase the bearing rigidity of the outer side as compared with that of the inner side. Thus, this extends the bearing life.

The outline of the wheel hub 15 continues from the raceway bottom of the inner raceway surface 15a to the cylindrical portion 15b through a counter portion 23, an axially extending shaft portion 18, a tapered step portion 18a and a shoulder portion 18b, which abuts the inner ring 16. In addition, an axially extending substantially conical recess 24 is formed in the outer side end of the wheel hub 15. This recess 24, formed by forging along the outline of the wheel hub 15, and the depth of the recess 24 extends at least into a position near the raceway bottom of the outer side inner raceway surface 15a. This makes the thickness of outer side portion of the wheel hub 15 substantially constant.

The diameter of the outer side outer raceway surface 12a is formed larger than that of the inner side outer raceway surface 12a because of the difference of the pitch circle diameters PCDo, PCDi. An annular recess 27 is formed between a shoulder portion 25 of the outer side outer raceway surface 12a and a shoulder portion 26 of the inner side outer raceway surface 12b in order to reduce the weight of the bearing.

Similarly to the first embodiment and also in this embodiment, the inner raceway surface 16a of the inner ring 16 and the outer raceway surface 12b of the outer member 12 are formed as circular arc configuration, respectively, including circular arc sections having radii of curvatures r, r1 and r2, r3 and inflection points P0 and Q0 of these radii of curvatures r, r1 and r2, r3 are set to have the relationship $\alpha1=\alpha+\Delta\alpha$. Thus, it is possible to prevent the generation of excessive pre-load during steady travel of a vehicle and the deficiency of the pre-load during curving travel of a vehicle and thus to apply a proper pre-load to the bearing. The pre-load level is set at 0 to 10 μm during straight advancing travel of a vehicle (contact points P, Q) and at 10 to 50 μm during curving travel of a vehicle (contact points P0, Q0). This makes it possible to assure the initially applied pre-load during steady travel of a vehicle and thus to prevent an increase in the rolling resistance while suppressing an excessive pre-load as well as to improve the durability of bearing while increasing the pre-load level during curving travel of a vehicle without adding any additional part to the bearing. In addition, structures similar to those of the second or third embodiment can be applied to this embodiment.

The vehicle wheel bearing apparatus of the present disclosure can be applied to any of the bearing apparatus of the first through fourth generations formed with a double row angular contact ball bearing.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents thereof.

What is claimed is:

1. A vehicle wheel bearing apparatus comprising:
an outer member formed with double row outer raceway surfaces on the outer member inner circumference;
an inner member formed with double row inner raceway surfaces on the inner member outer circumference opposing the double row outer raceway surfaces of the outer member;
double row balls freely rollably contained between the outer and inner raceway surfaces and the balls adapted to be applied at a predetermined contact angle on the outer and inner raceway surfaces;
at least the inner raceway surfaces of the outer and inner raceway surfaces are formed as circular arc sections, each circular arc section having two radii of curvatures, each inner raceway surface circular arc section is formed by a first circular arc section and a second circular arc section, the first circular arc section with a first radius of curvature, the first circular arc section with the first radius of curvature extends between an inflection contact point (P0) to the raceway bottom and during steady travel of the vehicle, the ball rides on the first circular arc section at a contact point (P) which contacts the ball at an initial contact angle $\alpha$, and the second circular arc section with a second radius of curvature, the second radius of curvature is smaller than the first radius of curvature, the second circular section with the second radius of curvature extends between the inflection contact point (P0) to the radially outer side, the contact point and inflection point are different, the ball contacts the inflection point at a contact angle ($\alpha1$), during cornering, a large moment load is applied to the ball, the contact point of the ball moves over the inflection point (P0) onto the second circular arc section resulting in securement with a greater preload, the first and second radii of curvature are set, respectively, as 1.05 d<2×first radius of curvature ≤1.10 d and 1.01 d<2×second radius of curvature ≤1.05 d (wherein "d" is a diameter of the ball) and the difference ($\Delta\alpha$) between $\alpha1$ and $\alpha$ being set in the range of 2° to 8° prevents the generation of excessive pre-load during steady travel of the vehicle and a deficiency of the pre-load does not occur during curved travel of the vehicle when the inflection contact point of the first and second radii of curvature is positioned at $\alpha1=\alpha+\Delta\alpha$ ($\alpha=30$ to 45 degrees).

2. The vehicle wheel bearing apparatus of claim 1, wherein the pitch circle diameter of the outer side ball group of the double row balls is set larger than the pitch circle diameter of the inner side ball group.

3. The vehicle wheel bearing apparatus of claim 1, wherein the outer raceway surfaces of the outer and inner raceway surfaces are formed as circular arc sections each having two radii of curvatures, wherein each outer raceway surface is formed by a first circular arc section with a first radius of curvature that extends from a position near a contact point contacting the ball at an initial contact angle and a second circular arc section with a second radius of curvature, smaller than the first radius of curvature, extends from an inflection point where the ball contacts at a contact angle to the radially inner side, and wherein the first and second radii of curvature are set respectively as 1.07 d<2×first radius of curvature≤1.12 d and 1.03 d<2×second radius of curvature≤1.07 d (wherein "d" is a diameter of the ball).

4. The vehicle wheel bearing apparatus of claim 1, wherein the inner raceway surfaces and the outer raceway surfaces are finished to have predetermined finished configurations by a quenched steel cutting after a heat treatment.

5. The vehicle wheel bearing apparatus of claim 1, wherein the pre-load level is set at 0 to 10 μm on straight advancing travel and at 10 to 50 μm on curving travel.

6. The vehicle wheel bearing apparatus of claim 1, wherein the balls of double row balls are formed with balls of larger diameter and balls with smaller diameter which are alternately arranged in a regular fashion.

7. The vehicle wheel bearing apparatus of claim 6, wherein the difference of diameter of the larger diameter ball and the smaller diameter ball is set within a range of 5 to 10 μm.

8. The vehicle wheel bearing apparatus of claim 1, wherein the balls of double row balls are formed by ceramic balls and steel balls.

9. The vehicle wheel bearing apparatus of claim 8, wherein only the balls of ball group where a moment load is loaded on a vehicle during curved travel of the vehicle are formed by ceramic balls and the other balls of the ball group are formed by steel balls.

10. The vehicle wheel bearing apparatus of claim 8, wherein the balls of double row ball groups are formed by ceramic balls and steel balls which are alternately arranged in a regular fashion.

11. The vehicle wheel bearing apparatus of claim 8, wherein the balls of double row ball groups are formed of balls with larger diameters and smaller diameters that are alternately arranged in a regular fashion and the balls of larger diameter are formed by ceramic balls.

12. The vehicle wheel bearing apparatus of claim 8, wherein the ceramic balls are formed of sintered body comprising β-sialon as a primary ingredient having a composition formula of $Si_6-zAlzOzN_8-z$ and satisfying $0.1 \le z \le 3.5$ and the remainder of impurities.

13. The vehicle wheel bearing apparatus of claims 8, wherein the ceramic balls are formed of a sintered body comprising β-sialon as a primary ingredient having a composition formula of $Si_6-zAlzOzN_8-z$ and satisfying $0.1 \le z \le 3.5$ and the remainder of a sintering assistant and irreversible impurities.

14. The vehicle wheel bearing apparatus of claim 8, wherein the ratio of a mixture of the steel balls and the ceramic balls is set within a range of 3:7 to 7:3 including 1:1.

15. The vehicle wheel bearing apparatus of claim 8, wherein the surface of the ceramic balls is formed with a dense layer having higher denseness than that of the inside of the ball.

16. The vehicle wheel bearing apparatus of claim 15, wherein the square ratio of a white region of a cross-section of the dense layer, observed as white when observed by inclined beams of an optical microscope, is set at 7% or less.

17. The vehicle wheel bearing apparatus of claim 16, wherein the region including the surface of the dense layer is formed with a high dense layer having further higher denseness than that of the other region inside the dense layer.

18. The vehicle wheel bearing apparatus of claim 17, wherein the square ratio of a white region of a cross-section of the high dense layer, observed as white when observed by inclined beams of an optical microscope, is set at 3.5% or less.

* * * * *

UNITED STATES PATENT AND TRADEMARK OFFICE
CERTIFICATE OF CORRECTION

| | | |
|---|---|---|
| PATENT NO. | : 8,678,661 B2 | Page 1 of 1 |
| APPLICATION NO. | : 13/155501 | |
| DATED | : March 25, 2014 | |
| INVENTOR(S) | : Takayuki Norimatsu | |

It is certified that error appears in the above-identified patent and that said Letters Patent is hereby corrected as shown below:

In the Specification

Column 9
Line 37          "CaO" should be --can--

Column 18
Line 19          "Microphoto-F)(A)" should be --Microphoto-FXA)--

Column 19
Line 4           "18.5%" should be --18.5%.--

Signed and Sealed this
Twelfth Day of August, 2014

Michelle K. Lee
*Deputy Director of the United States Patent and Trademark Office*